(12) United States Patent
Kiyonaga et al.

(10) Patent No.: US 11,434,803 B2
(45) Date of Patent: Sep. 6, 2022

(54) COMBUSTION SYSTEM

(71) Applicants: THE CHUGOKU ELECTRIC POWER CO., INC., Hiroshima (JP); TOKYO METROPOLITAN PUBLIC UNIVERSITY CORPORATION, Tokyo (JP)

(72) Inventors: Eiji Kiyonaga, Hiroshima (JP); Kazuhiro Yoshida, Hiroshima (JP); Keiichiro Morita, Hiroshima (JP); Toru Murayama, Tokyo (JP); Masatake Haruta, Tokyo (JP); Shinichi Hata, Tokyo (JP); Yusuke Inomata, Tokyo (JP)

(73) Assignees: THE CHUGOKU ELECTRIC POWER CO., INC., Hiroshima (JP); TOKYO METROPOLITAN PUBLIC UNIVERSITY CORPORATION, Tokyo (JP)

( * ) Notice: Subject to any disclaimer, the term of this patent is extended or adjusted under 35 U.S.C. 154(b) by 0 days.

(21) Appl. No.: 17/436,950

(22) PCT Filed: Mar. 7, 2019

(86) PCT No.: PCT/JP2019/009200
§ 371 (c)(1),
(2) Date: Sep. 7, 2021

(87) PCT Pub. No.: WO2020/179075
PCT Pub. Date: Sep. 10, 2020

(65) Prior Publication Data
US 2022/0170402 A1 Jun. 2, 2022

(51) Int. Cl.
*F01N 3/28* (2006.01)
*B01J 23/22* (2006.01)
(Continued)

(52) U.S. Cl.
CPC ............ *F01N 3/2803* (2013.01); *B01J 23/22* (2013.01); *F01N 5/04* (2013.01); *F22B 1/1807* (2013.01);
(Continued)

(58) Field of Classification Search
CPC ...... F01N 3/2803; F01N 5/04; F01N 2370/02; B01J 23/22; F22B 1/1807; F23J 15/022
(Continued)

(56) References Cited

U.S. PATENT DOCUMENTS 5,087,600 A * 2/1992 Kato .................. B01D 53/8628
502/309
6,027,697 A * 2/2000 Kurihara ............ B01D 53/8662
422/177
7,829,033 B2 * 11/2010 Sun ........................ B01D 53/90
422/171
(Continued)

FOREIGN PATENT DOCUMENTS

JP S57-038939 A 3/1982
JP H11-342337 A 12/1999
(Continued)

*Primary Examiner* — Tom P Duong
(74) *Attorney, Agent, or Firm* — Muncy, Geissler, Olds & Lowe, P.C.

(57) ABSTRACT

Provided is a combustion system using a catalyst having better denitration efficiency at low temperatures, during a selective catalytic reduction reaction in which ammonia is used as a reducing agent.

This combustion system comprises: a combustion device that combusts fuel; an exhaust path through which flows exhaust gas generated from the combustion of fuel in the combustion device; a dust collection device that is arranged on the exhaust path and collects soot/dust in the exhaust gas; and a denitration device that is arranged on the exhaust path and removes nitrogen oxides from the exhaust gas by means of a denitration catalyst, wherein the denitration device is arranged downstream of the dust collection device on the exhaust path, and the denitration catalyst contains vanadium (Continued)

oxide, has a carbon content of 0.05 wt % or more, and has a defect site in which oxygen deficiency occurs in a crystal structure.

6 Claims, 26 Drawing Sheets

(51) Int. Cl.
F23J 15/02 (2006.01)
F22B 1/18 (2006.01)
F01N 5/04 (2006.01)

(52) U.S. Cl.
CPC ......... *F23J 15/022* (2013.01); *F01N 2370/02* (2013.01)

(58) Field of Classification Search
USPC ....................................... 422/168
See application file for complete search history.

(56) References Cited

U.S. PATENT DOCUMENTS

| 8,211,391 | B2* | 7/2012 | Ellery | B01D 53/8631 |
| | | | | 423/247 |
| 8,661,993 | B2* | 3/2014 | Kamiyama | F23J 15/06 |
| | | | | 73/28.01 |
| 9,857,125 | B2* | 1/2018 | Zhang | B01D 53/869 |
| 2004/0180783 | A1* | 9/2004 | Nojima | B01D 53/8628 |
| | | | | 502/309 |
| 2008/0182746 | A1 | 7/2008 | Matsueda et al. | |
| 2009/0282803 | A1* | 11/2009 | Bono | F23J 15/06 |
| | | | | 60/39.5 |
| 2011/0311424 | A1* | 12/2011 | Ellery | F23J 15/025 |
| | | | | 423/235 |
| 2012/0070763 | A1 | 3/2012 | Monden et al. | |
| 2018/0245511 | A1* | 8/2018 | Goto | F02B 77/083 |
| 2018/0272278 | A1* | 9/2018 | Kiyonaga | F01N 5/02 |
| 2018/0272318 | A1 | 9/2018 | Kiyonaga et al. | |

FOREIGN PATENT DOCUMENTS

| JP | 2000-197822 | A | 7/2000 |
| JP | 2004-275852 | A | 10/2004 |
| JP | 2007-167780 | A | 7/2007 |
| JP | 6093101 | B1 | 2/2017 |
| JP | 6410202 | B2 | 10/2018 |
| WO | WO2010/131636 | A1 | 11/2010 |
| WO | WO2017/042895 | A1 | 3/2017 |

\* cited by examiner

Temperature dependency of NO conversion rate

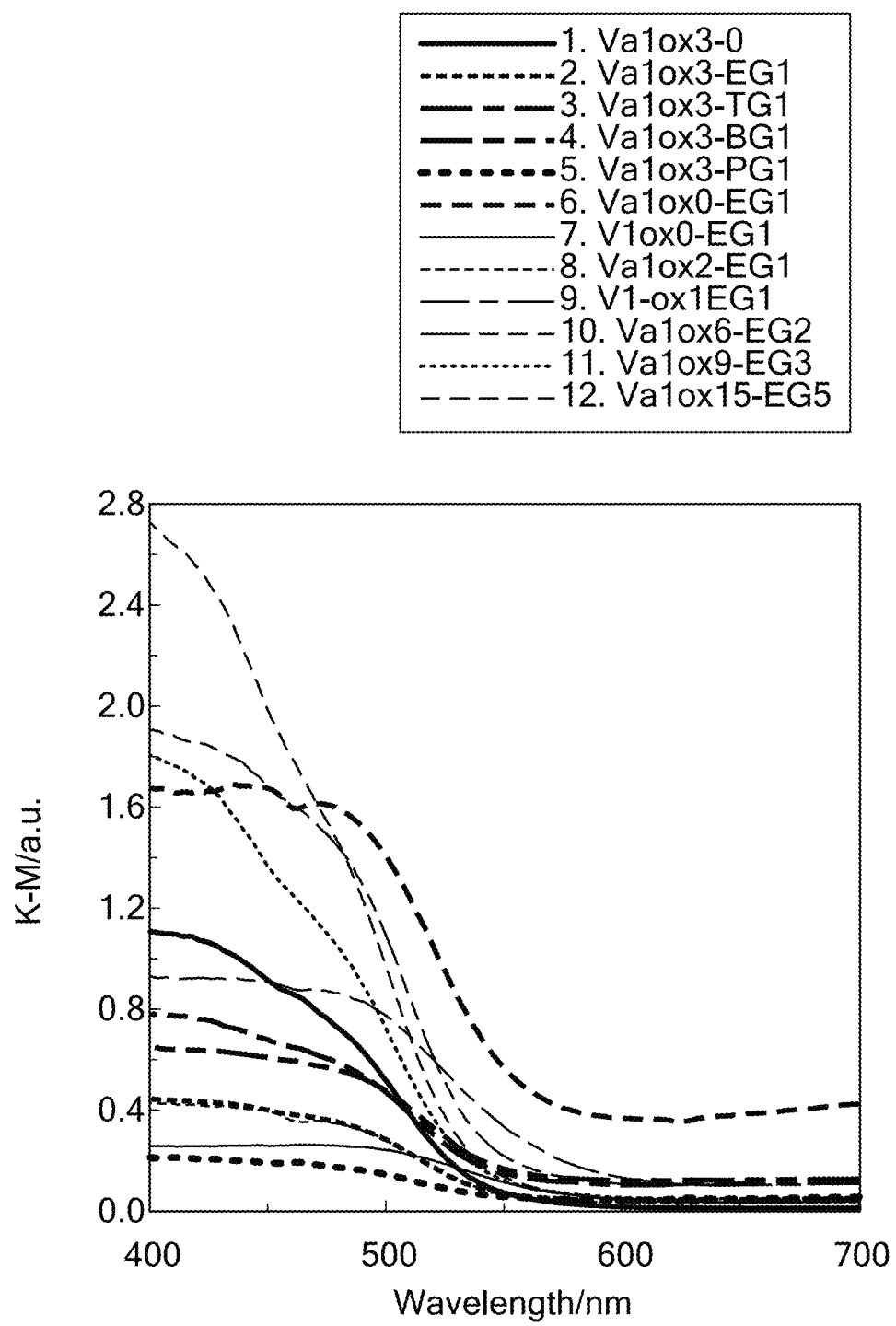

NO conversion rate

Reaction rate

COMBUSTION SYSTEM

TECHNICAL FIELD

The present invention relates to a combustions system. In more detail, the present invention relates to a combustion system which purifies exhaust gas produced by fuel combusting, using a denitration catalyst.

BACKGROUND ART

As one of the pollutants emitted into air by the combustion of fuel, nitrogen oxides (NO, $NO_2$, $NO_3$, $N_2O$, $N_2O_3$, $N_2O_4$, $N_2O_5$) can be exemplified.
The nitrogen oxides induce acid rain, ozone layer depletion, photochemical smog, etc., and have a serious influence on the environment and human bodies; therefore, treatment thereof is an important problem.

As technology for removing the above-mentioned nitrogen oxides, the selective catalytic reduction reaction ($NH_3$—SCR) with ammonia ($NH_3$) as the reductant has been known. As disclosed in Patent Document 1, a catalyst using titanium oxide as the carrier and supporting vanadium oxide is being widely used as the catalyst used in the selective catalytic reduction reaction. Titanium oxide has low activity for sulfur oxides, and has high stability; therefore, it is best established as the carrier.

On the other hand, although vanadium oxide plays a main role in $NH_3$—SCR, since it oxidizes $SO_2$ to $SO_3$, it has not been able to support on the order of 1 wt % or more of vanadium oxide.
In addition, with conventional $NH_3$—SCR, since the catalyst made by supporting vanadium oxide on a titanium oxide carrier almost does not react at low temperature, it must be used at high temperatures such as 350 to 400° C.
However, in order to raise the degrees of freedom of design in devices and facilities realizing $NH_3$—SCR and make more efficient, the development of a catalyst exhibiting high nitrogen oxide reduction rate activity at low temperatures has been demanded.

Subsequently, the present inventors have found a denitration catalyst in which vanadium pentoxide is present in at least 43 wt %, having a BET specific surface area of at least 30 $m^2/g$, and which can be used in denitration at 200° C. or lower (Patent Document 2).

Patent Document 1: Japanese Unexamined Patent Application, Publication No. 2004-275852
Patent Document 2: Japanese Patent No. 6093101

DISCLOSURE OF THE INVENTION

Problems to be Solved by the Invention

The present inventors, as a result of thorough research trying to achieve a further improvement of the above Patent Document 2, found a denitration catalyst exhibiting a more superior reduction rate activity of nitrogen oxides.

The present invention has an object of providing a combustion system made using a catalyst having better denitration efficiency at low temperature compared to the conventional technology, upon the selective catalytic reduction reaction with ammonia as the reductant.

Means for Solving the Problems

The present invention relates to a combustion system including: a combustion device which combusts a fuel; an exhaust channel through which exhaust gas generated by the fuel combusting in the combustion device flows; a dust collector which is disposed in the exhaust channel, and collects ash dust in the exhaust gas; and a denitration device which is disposed in the exhaust channel, and removes nitrogen oxides from the exhaust gas by way of a denitration catalyst, in which the denitration device is disposed on a downstream side of the dust collector in the exhaust channel, and the denitration catalyst contains vanadium oxide, has a carbon content of at least 0.05 wt %, and has a defect site at which an oxygen deficiency occurs in a crystal structure.

In addition, it is preferably for the combustion system to further include an air preheater disposed in the exhaust channel, and recovers heat from the exhaust gas, and the air preheater to be disposed on an upstream side of the dust collector.

In addition, the present invention relates to a combustion system including: a combustion device which combusts a fuel; an exhaust channel through which exhaust gas generated by the fuel combusting in the combustion device flows; an air preheater which is disposed in the exhaust channel, and recovers heat from the exhaust gas; and a denitration device which is disposed in the exhaust channel, and removes nitrogen oxides from the exhaust gas by way of a denitration catalyst, in which the denitration device is disposed on a downstream side of the air preheater in the exhaust channel, and the denitration catalyst contains vanadium oxide, has a carbon content of at least 0.05 wt %, and has a defect site at which an oxygen deficiency occurs in a crystal structure.

In addition, the present invention relates to a combustion system including: an internal combustion engine which combusts a fuel; an exhaust channel through which exhaust gas generated by the fuel combusting in the internal combustion engine flows; an exhaust heat recovery device which is disposed in the exhaust channel and recovers exhaust heat from exhaust gas discharged from the internal combustion engine; and a denitration device which is disposed in the exhaust channel, and removes nitrogen oxides from the exhaust gas by way of a denitration catalyst, in which the denitration device is disposed on a downstream side of the exhaust heat recovery device in the exhaust channel, and the denitration catalyst contains vanadium oxide, has a carbon content of at least 0.05 wt %, and has a defect site at which an oxygen deficiency occurs in a crystal structure.

In addition, it is preferable for the exhaust heat recovery device to include a turbine device and an exhaust gas economizer; the exhaust gas economizer generates steam with exhaust gas discharged from the internal combustion engine and exhaust gas supplied from the turbine device as heat sources; and the turbine device conducts power generation using the exhaust gas discharged from the internal combustion engine and steam supplied from the exhaust gas economizer.

Furthermore, it is preferable for having a defect site at which an oxygen deficiency occurs to indicate a ratio (P1/P2) of a peak intensity P2 of wavelength 494 to 549 $cm^{-1}$ originating from edge-sharing 3V—Oc stretching vibration relative to a peak intensity P1 of wavelength 462 to 494 $cm^{-1}$ originating from crosslinked V—$O_B$—V bending vibration being 0.98 or less, in infrared transmission spectrum of the denitration catalyst.

Effects of the Invention

A combustion system according to the present invention has better denitration efficiency at low temperature compared to the conventional technology, upon the selective catalytic reduction reaction with ammonia as the reductant.

BRIEF DESCRIPTION OF THE DRAWINGS

FIG. 4 is a graph showing the ultraviolet and visible absorption spectrum of the vanadium pentoxide catalysts of Examples 1 to 6 and Comparative Examples 1 to 6;

PREFERRED MODE FOR CARRYING OUT THE INVENTION

Figure 1A:
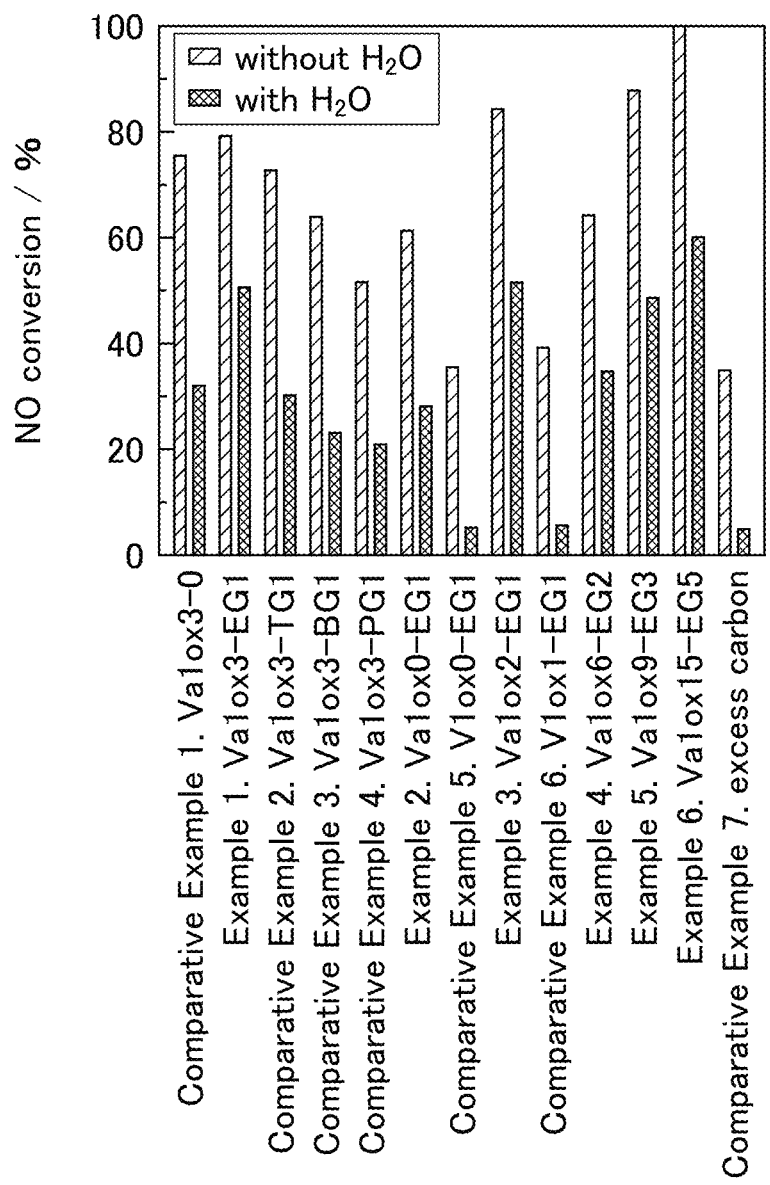
FIG. 1A is a graph showing the NO conversion rate of vanadium pentoxide catalysts of Examples 1 to 6 and Comparative Examples 1 to 7.

Hereinafter, a denitration catalyst according to an embodiment of the present invention will be explained.

A denitration catalyst of the present invention is a denitration catalyst containing vanadium oxide, in which the carbon content is at least 0.05 wt %, and having a defect site at which an oxygen deficiency occurs in the crystal structure. Such a denitration catalyst can exhibit a high denitration effect even under a low temperature environment, compared to a denitration catalyst such as a vanadium/titanium catalyst which is conventionally used.

Firstly, the denitration catalyst of the present invention contains vanadium oxide.

This vanadium oxide includes vanadium oxide (II) (VO), vanadium trioxide (III) ($V_2O_3$), vanadium tetroxide (IV) ($V_2O_4$), and vanadium pentoxide (V) ($V_2O_5$), and the V element of vanadium pentoxide ($V_2O_5$) may assume the pentavalent, tetravalent, trivalent and divalent form in the denitration reaction.

It should be noted that this vanadium oxide is a main component of the denitration catalyst of the present invention, and may contain other substances within a range no inhibiting the effects of the present invention; however, it is preferably present in at least 50% by vanadium pentoxide conversion, in the denitration catalyst of the present invention.

More preferably, vanadium oxide is preferably present in at least 99% by vanadium pentoxide conversion, in the denitration catalyst of the present invention.

More preferably, vanadium oxide is preferably present at about 100% by vanadium pentoxide conversion, in the denitration catalyst of the present invention.

Secondly, the denitration catalyst of the present invention has a carbon content of at least 0.05 wt %, but can exhibit a high denitration effect even under a low temperature environment, compared to a denitration catalyst such as a vanadium/titanium catalyst which is conventionally used, by containing carbon in such a high concentration.

If impurities gets into the denitration catalyst of the present invention, the crystal structure is not continuous since the amorphous portion is produced in the denitration catalyst, a high denitration effect is exhibited by the lines and planes in the crystal lattice distorting; however, it is assumed that higher denitration effect is exhibited as carbon exists more abundantly as this impurities.

In the embodiment of the present invention, in the selective catalytic reduction reaction with a reaction temperature of 200° C. or less using the denitration catalyst having a carbon content of 0.07 wt %, it exhibited a NO conversion rate of 84.3% in the case of no moisture coexistence, and exhibited a NO conversion rate of 51.5% in the case of moisture coexisting.

In addition, in the selective catalytic reduction reaction using the denitration catalyst having a carbon content of 0.16 wt %, it exhibited a NO conversion rate of 100% in the case of no moisture coexistence, and exhibited a NO conversion rate of 60.1% in the case of moisture coexisting.

In addition, in the selective catalytic reduction reaction using the denitration catalyst having a carbon content of 0.17 wt %, it exhibited a NO conversion rate of 87.8% in the case of no moisture coexistence, and exhibited a NO conversion rate of 48.6% in the case of moisture coexisting.

On the other hand, in the selective catalytic reduction reaction using the denitration catalyst having a carbon content of 0.01 wt %, it only exhibited a NO conversion rate of 35.5% in the case of no moisture coexistence, and only exhibited a NO conversion rate of 5.2% in the case of moisture coexisting.

In addition, in the selective catalytic reduction reaction using the denitration catalyst having a carbon content of 0.04 wt %, it only exhibited a NO conversion rate of 39.2% in the case of no moisture coexistence, and only exhibited a NO conversion rate of 5.6% in the case of moisture coexisting.

In addition, in the aforementioned description, although it is stated as preferable for the carbon content in the denitration catalyst to be at least 0.05 wt %, it may more preferably have a carbon content of at least 0.07 wt %.

More preferably, the carbon content may be at least 0.11 wt %.

More preferably, the carbon content may be at least 0.12 wt %.

More preferably, the carbon content may be at least 0.14 wt %.

More preferably, the carbon content may be at least 0.16 wt %.

More preferably, the carbon content may be at least 0.17 wt %.

Thirdly, the denitration catalyst of the present invention has a defect site at which oxygen deficiency occurs in the crystal structure. It should be noted that, herein, "defect site" indicates being a position (site) at which a certain type of atom is not occupied, while being a position (site) which be occupied by this certain atom in the crystal.

In the above way, in the denitration catalyst of the present invention, the structure of the vanadium oxide crystal contained in this denitration catalyst is locally disordered due to mixing of impurities, and can exhibit high denitration effect; however, by impurities getting into the vanadium oxide catalyst of the present invention, it is assumed that a high denitration effect is exhibited by the sites at which oxygen atoms in the crystal structure are deficient appearing. It should be noted that "site at which oxygen atoms are deficient" is also abbreviated as "oxygen defect site".

It should be noted that, herein, "having a defect site at which oxygen deficiency occurs" refers to a ratio (P1/P2) of a peak intensity P2 of wavenumber 494 to 549 $cm^{-1}$ originating from edge-sharing $3V—O_C$ stretching vibration, relative to a peak intensity P1 of wavenumber 462 to 494 $cm^{-1}$ originating from crosslinked $V—O_B—V$ bending vibration, in the infrared transmission spectrum of the denitration catalyst in the infrared transmission spectrum of the denitration catalyst, being no more than 0.98, after normalizing each spectrum with 1022 to 1016 $cm^{-1}$ originated from terminal V=O stretching vibration in the infrared transmission spectrum of the denitration catalyst, as described in the Examples later.

The wavenumber for calculating this "P1/P2" is the wavenumber in a case of the beginning to the end of the peak; however, in the case of calculating "P1/P2" using the wavenumber of the peak top, it may be calculated as the ratio of the peak intensity P2 of wavenumber 503 to 524 $cm^{-1}$ originating from the edge-sharing $3V—O_C$ stretching vibration, relative to the peak intensity P1 of wavenumbers 471 to 486 $cm^{-1}$ originating from crosslinked $V—O_B—V$ bending vibration.

Furthermore, the denitration catalyst of the present invention may have a line defect in which point defects such as the "defect site at which an oxygen deficiency occurs" are continuously arranged one-dimensionally, a plane defect in which the point defects are continuously arranged two-dimensionally, or a lattice defect such as lattice strain, for example.

In addition, the denitration catalyst of the present invention is preferably used in denitration at 270° C. or lower. This is derived from the firing temperature of denitration catalyst of the present invention being 270° C.

On the other hand, in the Examples described later, the denitration catalyst of the present invention exhibits high denitration effect in the selective catalytic reduction reaction at the reaction temperature of 200° C. or lower, and thus the denitration catalyst of the present invention is capable of use in denitration at 200° C. or lower. Since oxidation from $SO_2$ to $SO_3$ does not occur at 200° C. and lower, during the selective catalytic reduction reaction, oxidation of $SO_2$ to $SO_3$ is not accompanied, as in the knowledge obtained by the above Patent Document 2.

In addition, in the aforementioned disclosure, the denitration catalyst of the present invention is preferably used in denitration at 270° C. or lower; however, it may be preferably used in denitration at 200° C. or lower, and even more preferably, it may be used in denitration with a reaction temperature of 100 to 200° C.

More preferably, it may be used in denitration with a reaction temperature of 160 to 200° C.

Alternatively, it may be used in denitration with a reaction temperature of 80 to 150° C.

In addition, the absorption edge wavelength of the denitration catalyst of the present invention is preferably no more than 575 nm. Generally, a higher denitration effect can be exhibited for catalyst in which the absorption edge wavelength is shifted more to the blue side in this way. This is derived from the crystal structure collapsing as the absorption edge wavelength is shifted to the blue side.

In the embodiment of the present invention, for example, in the selective catalytic reduction reaction at the reaction temperature of 200° C. or lower, made using the denitration catalyst having an absorption edge wavelength of 567.4 nm, it exhibited a NO conversion rate of 61.3% in the case of not coexisting with moisture, and exhibited a NO conversion rate of 28.1% in the case of coexisting with moisture.

In addition, in the selective catalytic reduction reaction using a denitration catalyst having an absorption edge wavelength of 548.2 nm, it exhibited a NO conversion rate of 84.3% in the case of not coexisting with moisture, and exhibited a NO conversion rate of 51.5% in the case of coexisting with moisture.

In addition, with the selective catalytic reduction reaction using a denitration catalyst having an absorption edge wavelength of 547.7 nm, it exhibited a NO conversion rate of 79.2% in the case of not coexisting with moisture, and exhibited a NO conversion rate of 50.6% in the case of coexisting with moisture.

In addition, with the selective catalytic reduction reaction using a denitration catalyst having an absorption edge wavelength of 535.9 nm, it exhibited a NO conversion rate of 87.8% in the case of not coexisting with moisture, and exhibited a NO conversion rate of 48.6% in the case of coexisting with moisture.

In addition, with the selective catalytic reduction reaction using the denitration catalyst having an absorption edge wavelength of 534.5 nm, it exhibited a NO conversion rate of 100% in the case of not coexisting with moisture, and exhibited a NO conversion rate of 60.1% in the case of coexisting with moisture.

On the other hand, with the selective catalytic reduction reaction using the denitration catalyst having an absorption edge wavelength of 587.3 nm, it only exhibited a NO conversion rate of 35.5% in the case of not coexisting with moisture, and exhibited a NO conversion rate of 5.2% in the case of coexisting with moisture.

In addition, also with the selective catalytic reduction reaction using the denitration catalyst having an absorption edge wavelength of 580.1 nm, it only exhibited a NO conversion rate of 39.2% in the case of not coexisting with moisture, and exhibited a NO conversion rate of 5.6% in the case of coexisting with moisture.

In addition, although the absorption edge wavelength of the denitration catalyst is no more than 575 nm, it may preferably be no more than 568 nm.
More preferably, it may be no more than 549 nm.
More preferably, it may be no more than 548 nm.
More preferably, it may be no more than 536 nm.
More preferably, it may be no more than 535 nm.

In addition, the BET specific surface area of the denitration catalyst of the present invention is preferably at least 15.3 m²/g; however, it exhibits higher denitration effect as the catalyst has larger BET specific surface area in this way. It is assumed that this is because the number of sites which absorb more nitrogen oxides increases as the surface area per unit mass of denitration catalyst becomes larger.

In the embodiment of the present invention, with the selective catalytic reduction reaction at a reaction temperature of 200° C. or lower using a denitration catalyst having a BET specific surface area of 15.3 m²/g, it exhibited a NO conversion rate of 61.3% in the case of not coexisting with moisture, and exhibited a NO conversion rate of 28.1% in the case of coexisting with moisture.

In addition, with the selective catalytic reduction reaction using a denitration catalyst having a BET specific surface area of 19.2 m²/g, it exhibited a NO conversion rate of 64.2% in the case of not coexisting with moisture, and exhibited a NO conversion rate of 34.7% in the case of coexisting with moisture.

In addition, with the selective catalytic reduction reaction using a denitration catalyst having a BET specific surface area of 24.9 m²/g, it exhibited a NO conversion rate of 79.2% in the case of not coexisting with moisture, and exhibited a NO conversion rate of 50.6% in the case of coexisting with moisture.

In addition, with the selective catalytic reduction reaction using a denitration catalyst having a BET specific surface area of 26.1 m²/g, it exhibited a NO conversion rate of 84.3% in the case of not coexisting with moisture, and exhibited a NO conversion rate of 51.5% in the case of coexisting with moisture.

In addition, with the selective catalytic reduction reaction using a denitration catalyst having a BET specific surface area of 26.7 m²/g, it exhibited a NO conversion rate of 87.8% in the case of not coexisting with moisture, and exhibited a NO conversion rate of 48.6% in the case of coexisting with moisture.

In addition, with the selective catalytic reduction reaction using a denitration catalyst having a BET specific surface area of 29.6 m²/g, it exhibited a NO conversion rate of 100% in the case of not coexisting with moisture, and exhibited a NO conversion rate of 60.1% in the case of coexisting with moisture.

On the other hand, with the selective catalytic reduction reaction at the reaction temperature of 200° C. or lower using a denitration catalyst having a BET specific surface area of 15.2 m²/g, it only exhibited a NO conversion rate of 35.5% in the case of not coexisting with moisture, and exhibited a NO conversion rate of 5.2% in the case of coexisting with moisture.

In addition, the BET specific surface area of the denitration catalyst is preferably at least 15.3 m²/g; however, it more preferably may be at least 19.2 m²/g.
More preferably, it may be at least 24.9 m²/g.
More preferably, the BET specific surface area of the denitration catalyst may be 26.1 m²/g.
More preferably, the BET specific surface area of the denitration catalyst may be at least 26.7 m²/g.
More preferably, the BET specific surface area of the denitration catalyst may be at least 29.6 m²/g.

It should be noted that the BET specific surface area of the denitration catalyst is preferably measured based on the criteria defined in JIS Z8830:2013.

The denitration catalyst containing vanadium oxide, and having carbon content of at least 0.05 wt %, and a defect site at which oxygen deficiency occurs in the crystal structure can be prepared by the sol gel method for the most part.

The sol gel method includes a step of firing after dissolving vanadate in a chelate compound and drying.
As the chelate compound, for example, that having a plurality of carboxyl groups such as oxalic acid and citric acid, that having a plurality of amino groups such as acetylacetonate and ethylenediamine, that having a plurality of hydroxyl groups such as ethylene glycol, etc. may be used.

In the embodiment of the present invention, a denitration catalyst produced by a method including a step of dissolving ammonium vanadate in oxalate solution, and a step of subsequently drying and firing exhibited a NO conversion rate of 64.2 to 100% in the case of not coexisting with moisture, and exhibited a NO conversion rate of 20.9 to 60.1% in the case of coexisting with moisture.

In addition, a denitration catalyst produced by a method including a step of adding only ethylene glycol to ammonium vanadate and drying exhibited a NO conversion rate of 61.3% in the case of not coexisting with moisture, and exhibited a NO conversion rate of 28.1% in the case of coexisting with moisture.

On the other hand, as the denitration catalyst produced by a method not including such a step, for example, a denitration catalyst obtained by firing only ammonium vanadate to make vanadium pentoxide, followed by adding only ethylene glycol and firing only exhibited a NO conversion rate of 35.5% in the case of not coexisting with moisture, and exhibited a NO conversion rate of 5.2% in the case of coexisting with moisture.

In addition, a denitration catalyst obtained by firing only ammonium vanadate to make vanadium pentoxide, followed by adding oxalic acid and ethylene glycol and firing only exhibited a NO conversion rate of 39.2% in the case of not coexisting with moisture, and exhibited a NO conversion rate of 5.6% in the case of coexisting with moisture.

In addition, the denitration catalyst of the present invention, in the embodiment, is produced by a method which adds ethylene glycol to a precursor complex synthesized by mixing ammonium vanadate and oxalic acid, and then firing. The denitration catalyst produced by such a method can exhibit a high denitration effect even under a low temperature environment, compared to a denitration catalyst such as a vanadium/titanium catalyst which is conventionally used. This is assumed to be because the carbon content in the denitration catalyst becomes high by adding ethylene glycol.

In the embodiment of the present invention, a denitration catalyst produced by a method of adding ethylene glycol to precursor complex synthesized by mixing ammonium vanadate and oxalic acid, and then firing exhibited a NO conversion rate of 64.2 to 100% in the case of not coexisting with moisture, and exhibited a NO conversion rate of 34.7 to 60.1% in the case of coexisting with moisture.

On the other hand, for example, a denitration catalyst produced by a method of adding propylene glycol to precursor complex synthesized by mixing ammonium vanadate and oxalic acid, and then firing exhibited a NO conversion rate of 51.6% in the case of not coexisting with moisture, and exhibited a NO conversion rate of 20.9% in the case of coexisting with moisture.

In addition, in the above-mentioned production method, the molar ratio of oxalic acid to the ammonium vanadate is at least 2.

The denitration catalyst produced by such a method can exhibit high denitration effect even under a low temperature environment, compared to a denitration catalyst such as a vanadium/titanium catalyst which is conventionally used. The matter of this originating from the vanadium pentoxide becoming higher specific surface area by adding oxalic acid serves as the reason.

In the above-mentioned production method according to the embodiment of the present invention, the denitration catalyst produced by a method in which the molar ratio of oxalic acid to ammonium vanadate becomes 2 exhibited a NO conversion rate of 84.3% in the case of not coexisting with moisture, and exhibited a NO conversion rate of 51.5% in the case of coexisting with moisture.

In addition, the denitration catalyst produced by a method in which the molar ratio of oxalic acid to ammonium vanadate becomes 3 exhibited a NO conversion rate of 51.6 to 79.2% in the case of not coexisting with moisture, and exhibited a NO conversion rate of 20.9 to 50.6% in the case of coexisting with moisture.

In addition, the denitration catalyst produced by a method in which the molar ratio of oxalic acid to ammonium vanadate becomes 6 exhibited a NO conversion rate of 64.2% in the case of not coexisting with moisture, and exhibited a NO conversion rate of 34.7% in the case of coexisting with moisture.

In addition, the denitration catalyst produced by a method in which the molar ratio of oxalic acid to ammonium vanadate becomes 9 exhibited a NO conversion rate of 87.8% in the case of not coexisting with moisture, and exhibited a NO conversion rate of 48.6% in the case of coexisting with moisture.

In addition, the denitration catalyst produced by a method in which the molar ratio of oxalic acid to ammonium vanadate becomes 15 exhibited a NO conversion rate of 100% in the case of not coexisting with moisture, and exhibited a NO conversion rate of 60.1% in the case of coexisting with moisture.

It should be noted that the above-mentioned sol gel method, although depending on the chelate compound, preferably includes a step of dissolving vanadate in oxalic acid, so that the molar ratio of vanadate and oxalic acid becomes 1:2 to 1:15, for example.

It should be noted that the molar ratio of vanadate and oxalic acid preferably may be 1:3 to 1:15.

More preferably, the molar ratio of vanadate and oxalic acid may be 1:6 to 1:15.

More preferably, the molar ratio of vanadate and oxalic acid may be 1:9 to 1:15.

More preferably, the molar ratio of vanadate and oxalic acid may be 1:15.

In the denitration catalyst prepared in this way, normally, vanadium oxide is contained, the carbon content is at least 0.05 wt %, and has a defect site at which oxygen deficiency occurs in the crystal structure.

It should be noted that the present invention is not to be limited to the above embodiment, and that modifications, improvements, etc. within a scope that can achieve the object of the present invention are also encompassed by the present invention.

EXAMPLES

Hereinafter, Examples of the denitration catalyst of the present invention will be specifically explained together with Comparative Examples.

It should be noted that the present invention is not limited to these Examples.

1 Each Example and Comparative Example

Comparative Example 1

Ammonium vanadate was dissolved in an oxalic acid solution. Herein, the molar ratio of ammonium vanadate: oxalic acid is 1:3. After completely dissolving, the moisture in the solution was evaporated on a hot stirrer, and was dried overnight at 120° C. in a dryer.

Subsequently, the dried powder was fired for 4 hours at 300° C. in air. The fired vanadium pentoxide was established as the denitration catalyst of Comparative Example 1.

It should be noted the sample name of this denitration catalyst of Comparative Example 1 was set as "Va1ox3-0".
It should be noted that this Comparative Example 1 is a denitration catalyst disclosed in the above Patent Document 2.

Example 1

Ammonium vanadate ($NH_4VO_3$) and oxalic acid were dissolved in pure water.
After completely dissolving, the moisture in the solution was evaporated on a hot stirrer.
After mixing ethylene glycol with an oxalic acid-vanadium complex containing the prepared unreacted oxalic acid in an agate mortar for about 20 minutes, the denitration catalyst of vanadium pentoxide ($V_2O_5$) was obtained by twice firing at a temperature of 300° C. the obtained paste-like catalyst precursor by an electric oven.
Herein, the molar ratio of ammonium vanadate:oxalic acid: ethylene glycol is 1:3:1.
The vanadium pentoxide thereby obtained was defined as the denitration catalyst of Example 1.
It should be noted that the sample name of this denitration catalyst of Example 1 was set as "Va1ox3-EG1".

Comparative Example 2

By the same method as Example 1, the denitration catalyst of vanadium pentoxide was obtained by adding triethylene glycol to the precursor complex synthesized by adding oxalic acid to ammonium vanadate, and then firing.
Herein, the molar ratio of ammonium vanadate:oxalic acid: triethylene glycol is 1:3:1.
The vanadium pentoxide thereby obtained was defined as the denitration catalyst of Comparative Example 2.
It should be noted that the sample name of this denitration catalyst of Comparative Example 2 was set as "Va1ox3-TG1".

Comparative Example 3

By the same method as Example 1, the denitration catalyst of vanadium pentoxide was obtained by adding butylene glycol to the precursor complex synthesized by adding oxalic acid to ammonium vanadate, and then firing.
Herein, the molar ratio of ammonium vanadate:oxalic acid: butylene glycol is 1:3:1.
The vanadium pentoxide thereby obtained was defined as the denitration catalyst of Comparative Example 3.
It should be noted that the sample name of this denitration catalyst of Comparative Example 3 was set as "Va1ox3-BG1".

Comparative Example 4

By the same method as Example 1, the denitration catalyst of vanadium pentoxide was obtained by adding propylene glycol to the precursor complex synthesized by adding oxalic acid to ammonium vanadate, and then firing.
Herein, the molar ratio of ammonium vanadate:oxalic acid: propylene glycol is 1:3:1.
The vanadium pentoxide thereby obtained was defined as the denitration catalyst of Comparative Example 4.
It should be noted that the sample name of this denitration catalyst of Comparative Example 4 was set as "Va1ox3-PG1".

Example 2

The denitration catalyst of vanadium pentoxide was obtained by adding only ethylene glycol to ammonium vanadate, and then firing. Herein, the molar ratio of ammonium vanadate:oxalic acid:propylene glycol is 1:1.
The vanadium pentoxide thereby obtained was defined as the denitration catalyst of Example 2.
It should be noted that the sample name of this denitration catalyst of Example 2 was set as "Va1ox0-EG1".

Comparative Example 5

The denitration catalyst of vanadium pentoxide was obtained by firing only ammonium vanadate to make vanadium pentoxide, followed by adding only ethylene glycol, and then firing.
Herein, the molar ratio of ammonium vanadate:ethylene glycol is 1:1. The vanadium pentoxide thereby obtained was defined as the denitration catalyst of Comparative Example 5.
It should be noted that the sample name of this denitration catalyst of Comparative Example 5 was set as "V1ox0-EG1".

Example 3

The denitration catalyst of vanadium pentoxide was obtained by adding ethylene glycol to the precursor complex synthesized by adding oxalic acid to ammonium vanadate, and then firing.
Herein, the molar ratio of ammonium vanadate:oxalic acid: ethylene glycol is 1:2:1.
The vanadium pentoxide thereby obtained was defined as the denitration catalyst of Example 3.
It should be noted that the sample name of this denitration catalyst of Example 3 was set as "Va1ox2-EG1".

Comparative Example 6

The denitration catalyst of vanadium pentoxide was obtained by firing only ammonium vanadate to make vanadium pentoxide, followed by adding oxalic acid and ethylene glycol, and then firing.
Herein, the molar ratio of ammonium vanadate:oxalic acid: ethylene glycol is 1:1:1.
The vanadium pentoxide thereby obtained was defined as the denitration catalyst of Comparative Example 6.
It should be noted that the sample name of this denitration catalyst of Comparative Example 6 was set as "V1ox1-EG1".

Example 4

The denitration catalyst of vanadium pentoxide was obtained by adding ethylene glycol to the precursor complex synthesized by adding oxalic acid to ammonium vanadate, and then firing.
Herein, the molar ratio of ammonium vanadate:oxalic acid: ethylene glycol is 1:6:2.
The vanadium pentoxide thereby obtained was defined as the denitration catalyst of Example 4.

It should be noted that the sample name of this denitration catalyst of Example 4 was set as "Va1ox6-EG2".

Example 5

The denitration catalyst of vanadium pentoxide was obtained by adding ethylene glycol to the precursor complex synthesized by adding oxalic acid to ammonium vanadate, and then firing.
Herein, the molar ratio of ammonium vanadate:oxalic acid: ethylene glycol is 1:9:3.
The vanadium pentoxide thereby obtained was defined as the denitration catalyst of Example 5.
It should be noted that the sample name of this denitration catalyst of Example 5 was set as "Va1ox9-EG3".

Example 6

The denitration catalyst of vanadium pentoxide was obtained by adding ethylene glycol to the precursor complex synthesized by adding oxalic acid to ammonium vanadate, and then firing.
Herein, the molar ratio of ammonium vanadate:oxalic acid: ethylene glycol is 1:15:5.
The vanadium pentoxide thereby obtained was defined as the denitration catalyst of Example 6.
It should be noted that the sample name of this denitration catalyst of Example 6 was set as "Va1ox15-EG5".

Comparative Example 7

The denitration catalyst of vanadium pentoxide was obtained by adding ethylene glycol to the precursor complex synthesized by adding oxalic acid to ammonium vanadate, and then firing, and synthesized so that carbon remained in the vanadium pentoxide.
Herein, the molar ratio of ammonium vanadate:oxalic acid: ethylene glycol is 1:1.8:1.
The vanadium pentoxide thereby obtained was defined as the denitration catalyst of Comparative Example 7.
It should be noted that the sample name of this denitration catalyst of Comparative Example 7 was set as "excess carbon".

2. Evaluation

<2.1 BET Specific Surface Area>
(Measurement Method)
A Microtrac BEL BELSORP-max was used in the measurement of the BET specific surface area of each catalyst. After pretreating for 2 hours at 200° C. under an Ar atmosphere, it was measured at 196° C.
(Measurement Results)
[Table 1]

TABLE 1

| Sample | | BET specific surface area/m$^2$g$^{-1}$ |
|---|---|---|
| Comparative Example 1 | (Va1ox3-0) | 41.1 |
| Example 1 | (Va1ox3-EG1) | 24.9 |
| Comparative Example 2 | (Va1ox3-TG1) | 25.5 |
| Comparative Example 3 | (Va1ox3-BG1) | 26.0 |
| Comparative Example 4 | (Va1ox3-PG1) | 25.1 |
| Example 2 | (Va1ox0-EG1) | 15.3 |
| Comparative Example 5 | (V1ox0-EG1) | 15.2 |
| Example 3 | (Va1ox2-EG1) | 26.1 |
| Comparative Example 6 | (V1ox1-EG1) | 19.8 |
| Example 4 | (Va1ox6-EG2) | 19.2 |
| Example 5 | (Va1ox9-EG3) | 26.7 |
| Example 6 | (Va1ox15-EG5) | 29.6 |

BET specific surface area of vanadium pentoxide catalyst

Table 1 shows the BET specific surface areas of Examples 1 to 6, and Comparative Examples 1 to 6.
Except for Comparative Example 1 disclosed in Patent Document 2, a great difference was not found in the trend of values for BET specific surface area between the Examples and Comparative Examples.
More specifically, the example having the smallest BET specific surface area in the Examples was the value of 15.3 m$^2$/g of Example 2, and the example having the largest BET specific surface area was the value of 29.6 m$^2$/g of Example 6.
On the other hand, the example having the smallest BET specific surface area in the Examples was the value of 15.2 m$^2$/g of Example 5, and the example having the largest BET specific surface area other than Comparative Example 1 was the value of 26.0 m$^2$/g of Comparative Example 3.

<2.2 NO Conversion Rate>
(Measurement Method 1)
Under the conditions of Table 2 below, the NH$_3$—SCR reaction was conducted using a fixed bed flow-type reactor at a reaction temperature of 100 to 200° C.
In the gas passing through the catalyst layer, NO was analyzed by a Jasco FT-IR-4700.
[Table 2]

TABLE 2

NH3-SCR measurement conditions

| Catalyst amount | 0.375 mg |
|---|---|
| Gas flow rate | 250 mLmin$^{-1}$ |
| | (NO: 250 ppm, NH$_3$: 250 ppm, O$_2$: 4 vol %) |
| | (2000 ppm NO/Ar 31.3 mL min$^{-1}$) |
| | (2000 ppm NH$_3$/Ar 31.3 mL min$^{-1}$) |
| | (O$_2$ 14 mL min$^{-1}$) |
| | (Ar 177.4 mL min$^{-1}$) |
| Space velocity | 40,000 mLh$^{-1}$g$_{cat}^{-1}$ |

In addition, the NO conversion rate was calculated by Formula (1) noted below.
It should be noted that No$_{in}$ is the NO concentration at the reaction tube inlet, and NO$_{out}$ is the NO concentration of the reaction tube outlet.

Formula 1

$$\text{NO conversion rate [\%]} = \frac{\text{NO}_{in} - \text{NO}_{out}}{\text{NO}_{in}} \times 100 \quad \text{(Formula 1)}$$

(Measurement Results 1)

Table 3 shows the NO conversion rates of each vanadium pentoxide catalyst for both a case of moisture not coexisting and the case of coexisting with moisture.

FIG. 1A is a plot graphing this Table 3.

[Table 3]

TABLE 3

NO conversion rate of vanadium pentoxide catalyst

| Sample | | NO conversion rate/% | |
|---|---|---|---|
| | | without H$_2$O | with H$_2$O |
| Comparative Example 1 | (Va1ox3-0) | 75.5 | 32.0 |
| Example 1 | (Va1ox3-EG1) | 79.2 | 50.6 |
| Comparative Example 2 | (Va1ox3-TG1) | 72.7 | 30.2 |
| Comparative Example 3 | (Va1ox3-BG1) | 63.9 | 23.1 |
| Comparative Example 4 | (Va1ox3-PG1) | 51.6 | 20.9 |
| Example 2 | (Va1ox0-EG1) | 61.3 | 28.1 |
| Comparative Example 5 | (V1ox0-EG1) | 35.5 | 5.2 |
| Example 3 | (Va1ox2-EG1) | 84.3 | 51.5 |
| Comparative Example 6 | (V1ox1-EG1) | 39.2 | 5.6 |
| Example 4 | (Va1ox6-EG2) | 64.2 | 34.7 |
| Example 5 | (Va1ox9-EG3) | 87.8 | 48.6 |
| Example 6 | (Va1ox15-EG5) | 100 | 60.1 |
| Comparative Example 7 | (excess carbon) | 34.9 | 4.9 |

For both the case of moisture not coexisting and the case of coexisting with moisture, the denitration catalysts of Examples generally showed a higher NO conversion rate than the denitration catalysts of the Comparative Examples.

Above all, the denitration catalyst made by adding ethylene glycol as a precursor to ammonium vanadate and firing showed a high NO conversion rate.

Most importantly, Example 6 (Va1ox15-EG5) showed the highest NO conversion rate.

(Measurement Method 2)

Under the conditions of Table 2 above, the NH$_3$—SCR reaction was conducted by the same method as measurement method 1, at a plurality of reaction temperatures between 40° C. and 300° C. using the catalyst of Example 1 (Va1ox3-EG1).

(Measurement Results 2)

Figure 1B:
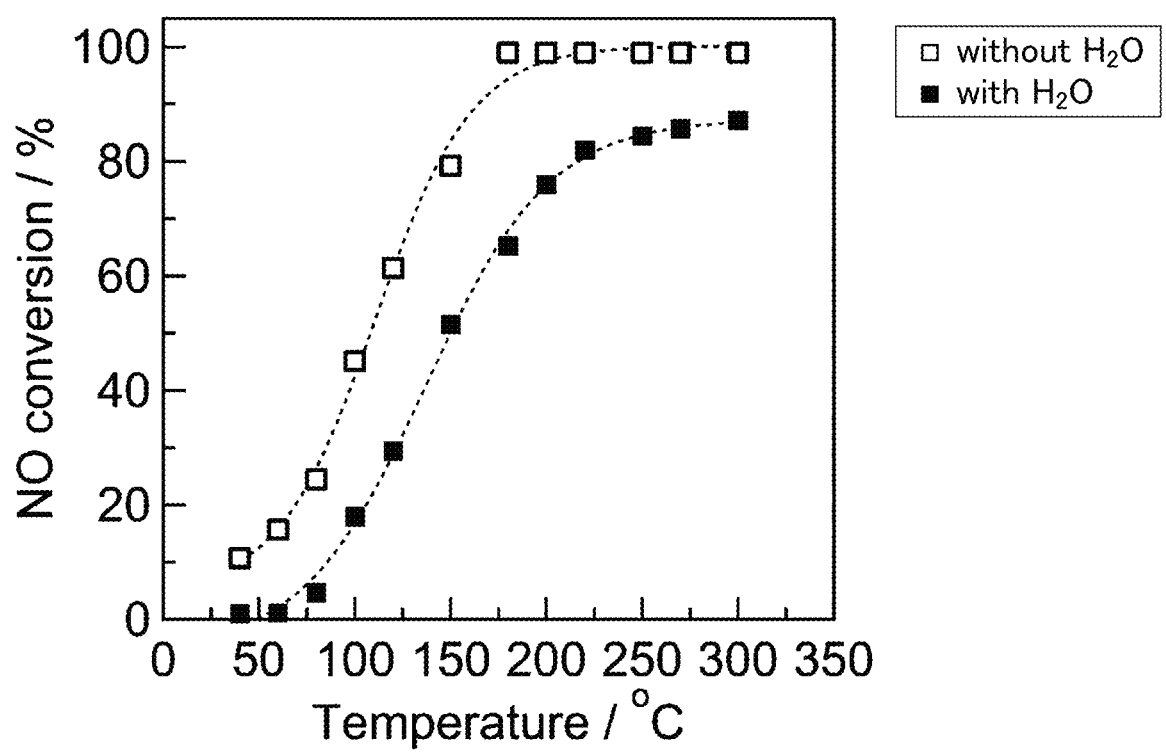
FIG. 1B is a graph showing the temperature dependency of the NO conversion rate of the vanadium pentoxide catalyst of Example 1.

FIG. 1B shows the change in NO conversion rates of both the case of moisture not coexisting and the case of coexisting with moisture, accompanying a change in reaction temperature of Example 1 (Va1ox3-EG1).

As is evident from the graph of FIG. 1B, although the NO conversion rate decreases when the reaction temperature drops below 200° C., for example, the NO conversion rate in the case of moisture not coexisting exhibits about 25% at the reaction temperature of approximately 80° C.

It was thereby shown that denitration catalyst according to the Examples of the present invention are useful to an extent in denitration at approximately 80° C.

<2.3 Reaction Rate>

The reaction rate of NO was calculated by applying the NO conversion rates listed in Table 3, specific surface area of each catalyst listed in Table 1, etc. to Formula (2) below.

Reaction rate [mol$_{NO}$m$_{cat}^{-1}$s$^{-1}$]=conversion rate [%]×NO concentration (250 ppm)×flowrate (250 mL/min)/60/22400 [mL/mol]/catalyst amount (0.375 g)/specific surface area [m$^2$/g] of each catalyst    Formula (2)

It should be noted that, in Formula (2), "60" is the numerical value for converting minutes into seconds.

Figure 2:
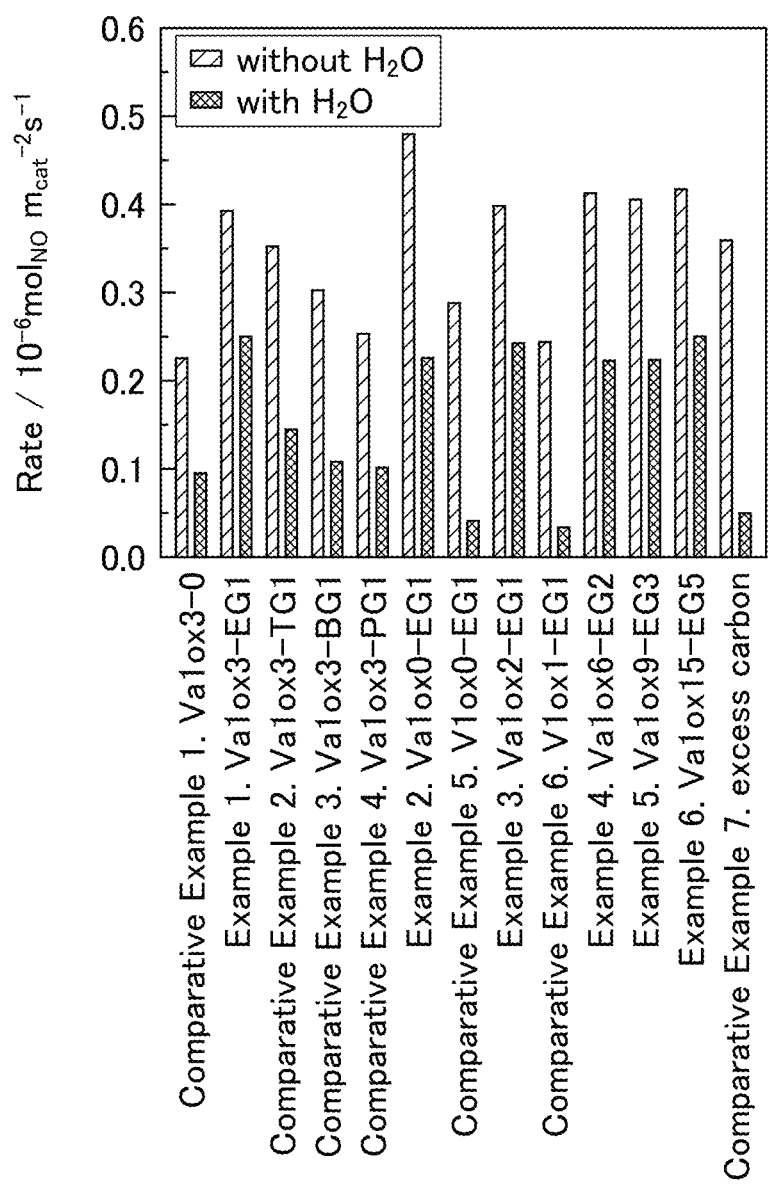
FIG. 2 is a graph showing the reaction rate of the vanadium pentoxide catalysts of Examples 1 to 6 and Comparative Examples 1 to 7.

FIG. 2 is a graph showing the reaction rates of each catalyst for both the case of moisture not coexisting and the case of coexisting with moisture.

In both the case of moisture not coexisting and the case of coexisting with moisture, the denitration catalysts of the Examples generally showed higher conversion rates than the denitration catalysts of the Comparative Examples.

Above all, the denitration catalyst made by adding ethylene glycol to ammonium vanadate as a precursor, and then firing showed a high NO conversion rate.

Since the reaction rates per specific surface area of these catalysts are roughly close values, the precursor amount is assumed to contribute to variation in the specific surface area.

In addition, the reaction rates per specific surface area (activity) became values all higher than the Comparative Example 1, including for both the Examples and Comparative Examples.

<2.4 Carbon Content>

(Measurement Method)

Upon measurement of the carbon content of each vanadium pentoxide catalyst, the carbon content was quantified by elemental analysis of C (carbon), H (hydrogen) and N (nitrogen).

In more detail, in the reaction tube at high temperature inside of a CE-440F made by Exeter Analytical Inc., each denitration catalyst was completely combusted and decomposed to convert the C, H and N which are the main constituent elements into CO$_2$, H$_2$O and N$_2$, followed by sequentially quantifying these three components in three thermal conductivity detectors to measure the contents of C, H and N in the constituent elements.

(Measurement Results)

Table 4 shows the carbon content of each vanadium pentoxide catalyst.

[Table 4]

TABLE 4

Carbon content of vanadium pentoxide

| Sample | | Carbon content/wt % |
|---|---|---|
| Comparative Example 1 | (Va1ox3-0) | 0.025 |
| Example 1 | (Va1ox3-EG1) | 0.17 |
| Comparative Example 2 | (Va1ox3-TG1) | 0.16 |
| Comparative Example 3 | (Va1ox3-BG1) | 0.07 |
| Comparative Example 4 | (Va1ox3-PG1) | 0.11 |
| Example 2 | (Va1ox0-EG1) | 0.14 |
| Comparative Example 5 | (V1ox0-EG1) | 0.01 |
| Example 3 | (Va1ox2-EG1) | 0.07 |
| Comparative Example 6 | (V1ox1-EG1) | 0.04 |
| Example 4 | (Va1ox6-EG2) | 0.12 |
| Example 5 | (Va1ox9-EG3) | 0.17 |
| Example 6 | (Va1ox15-EG5) | 0.16 |
| Example 7 | (excess carbon) | 3.21 |

According to the numerical values of Table 4, the carbon content included in the vanadium pentoxide catalysts of the Examples can be quantified as being at least 0.05 wt %.

(Relationship Between Carbon Content and Reaction Activity)

Figure 3A:
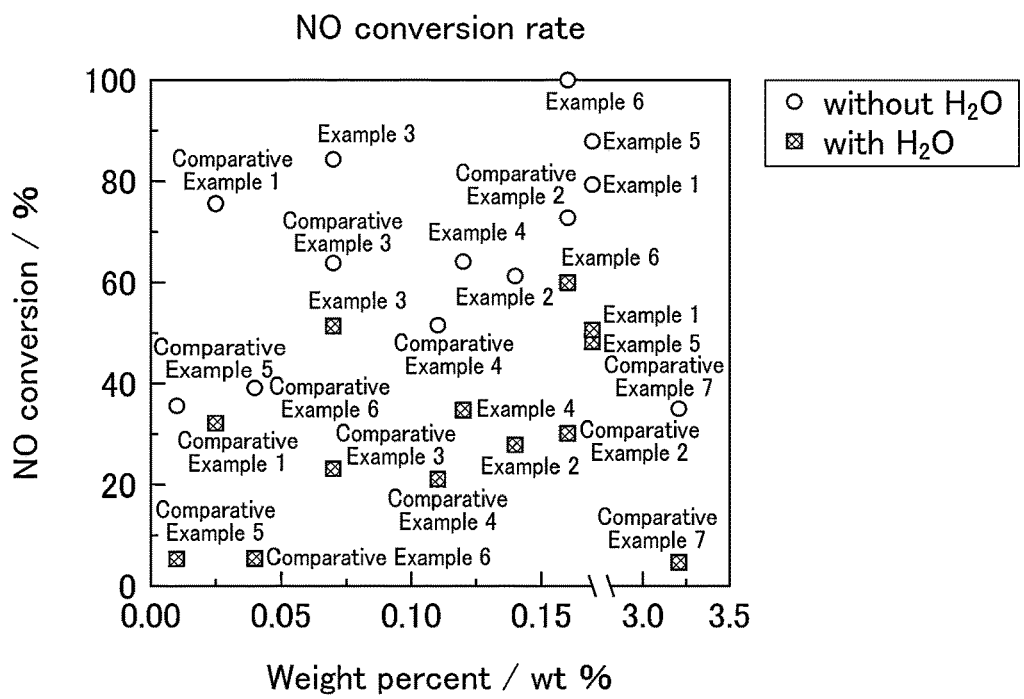
FIG. 3A is a graph showing the relationship between the carbon content and NO conversion rate of the vanadium pentoxide catalysts of Examples 1 to 6 and Comparative Examples 1 to 7.

FIG. 3A is a graph plotting the carbon content of each catalyst listed in Table 4 on the horizontal axis and plotting the NO conversion rate of each catalyst listed in FIG. 1 on the vertical axis. For Example 1 (Va1ox3-EG1)), Example 2 (Va1ox0-EG1), Example 5 (Va1ox9-EG3) and Example 6 (Va1ox15-EG5) having a higher NO conversion rate than Comparative Example 1 (Va1ox3-0), it was shown that the carbon content exceeds 0.05 wt %.

Figure 3B:
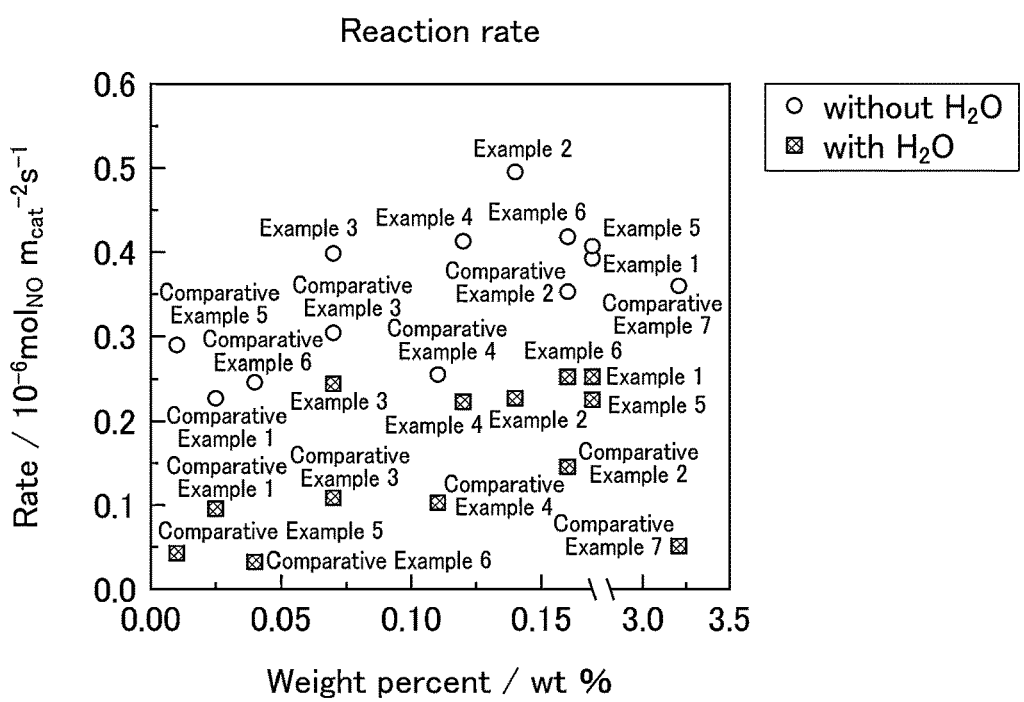
FIG. 3B is a graph showing the relationship between the carbon content and reaction rate of the vanadium pentoxide catalysts of Examples 1 to 6 and Comparative Examples 1 to 7.

FIG. 3B is a graph plotting the carbon content of each catalyst listed in Table 4 on the horizontal axis and plotting the reaction rate per specific surface area of each catalyst listed in FIG. 2 on the vertical axis.

Above all, in the case of moisture not coexisting, it was shown that the reaction rate per specific surface area became generally higher than Comparative Example 1 (Va1ox3-0) irrespective of the carbon content.

<2.5 Ultraviolet and Visible Absorption Spectrum>
(Measurement Method)

The ultraviolet and visible absorption spectrum of each vanadium pentoxide catalyst was measured.

FIG. 4 shows the spectral curve of each catalyst obtained as a result of measurement.

Furthermore, in FIG. 4, a tangent line is drawn from the inflection point of each spectral curve, and the absorption edge wavelength was calculated by obtaining the intersection with the horizontal axis.

In more detail, a sample of each vanadium pentoxide catalyst was filled into a sample holder including a white sheet of barium sulfate, and each ultraviolet and visible absorption spectrum was measured by the diffuse reflectance method. As the measuring apparatus, a UV-3100PC UV-visible spectrophotometer manufactured by Shimadzu was used.

(Measurement Results)

Table 5 shows the absorption edge wavelength of each vanadium pentoxide catalyst.

[Table 5]

TABLE 5

Absorption edge wavelength of vanadium pentoxide catalyst

| Sample | | Absorption edge wavelength/nm |
|---|---|---|
| Comparative Example 1 | (Va1ox3-0) | 537.4 |
| Example 1 | (Va1ox3-EG1) | 547.7 |
| Comparative Example 2 | (Va1ox3-TG1) | 551.8 |
| Comparative Example 3 | (Va1ox3-BG1) | 560.9 |
| Comparative Example 4 | (Va1ox3-PG1) | 561.0 |
| Example 2 | (Va1ox0-EG1) | 567.4 |
| Comparative Example 5 | (V1ox0-EG1) | 587.3 |
| Example 3 | (Va1ox2-EG1) | 548.2 |
| Comparative Example 6 | (V1ox1-EG1) | 580.1 |
| Example 4 | (Va1ox6-EG2) | 545.2 |
| Example 5 | (Va1ox9-EG3) | 535.9 |
| Example 6 | (Va1ox15-EG5) | 534.5 |

According to Table 5, since the value of the absorption edge wavelength differed according to each vanadium pentoxide, it is assumed that the electronic structure differs according to the catalyst.

In addition, the highest absorption edge wavelength in the Examples is the 567.4 nm of Example 2 (Va1ox0-EG1).

On the other hand, the highest absorption edge wavelength in the Comparative Examples is the 587.3 nm of Comparative Example 5 (V1ox0-EG1).

(Relationship Between Absorption Edge Wavelength and Reaction Activity)

Figure 5A:
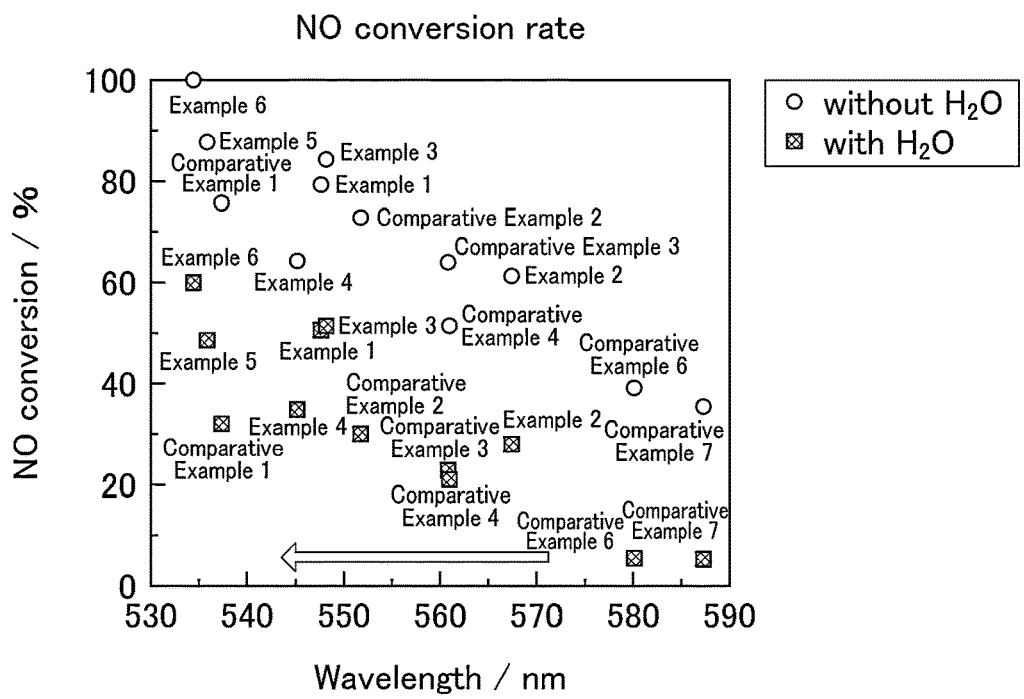
FIG. 5A is a graph showing the relationship between the adsorption edge wavelength and NO conversion rate of the vanadium pentoxide catalysts of Examples 1 to 6 and Comparative Examples 1 to 7.

FIG. 5A is a graph plotting the absorption edge wavelength of each catalyst listed in Table 5 on the horizontal axis, and plotting the NO conversion rate of each catalyst listed in FIG. 1 on the vertical axis.

A trend was shown in which the NO conversion rate rises accompanying the absorption edge wavelength blue shifting, i.e. accompanying the crystal state collapsing.

Figure 5B:
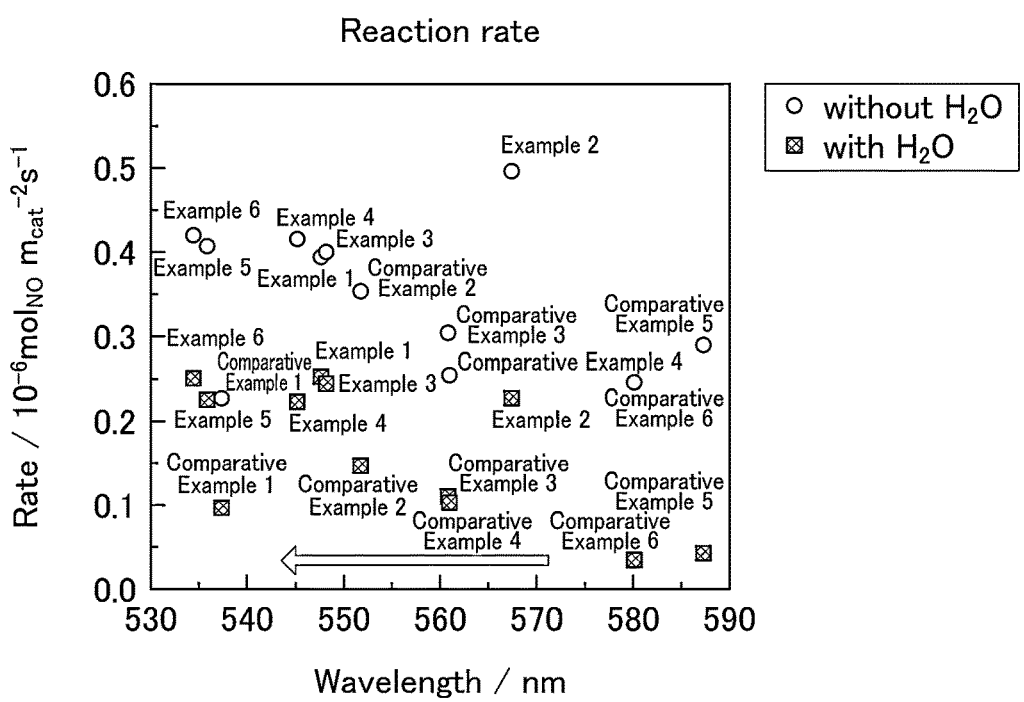
FIG. 5B is a graph showing the relationship between the adsorption edge wavelength and reaction rate of the vanadium pentoxide catalysts of Examples 1 to 6 and Comparative Examples 1 to 7.

FIG. 5B is a graph plotting the absorption edge wavelength of each catalyst listed in Table 5 on the horizontal axis, and plotting the reaction rate per specific surface area of each catalyst listed in FIG. 2 on the vertical axis.

A trend was shown in which the reaction rate per specific surface area rises accompanying the absorption edge wavelength blue shifting, i.e. accompanying the crystal state collapsing.

(Relationship Between Absorption Edge Wavelength and BET Specific Surface Area)

Figure 6:
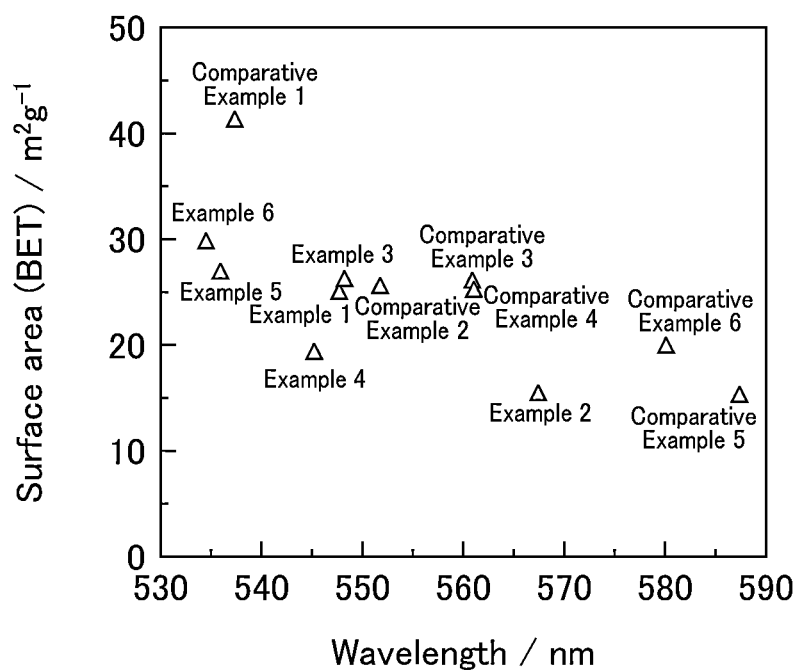
FIG. 6 is a graph showing the relationship between the adsorption edge wavelength and BET specific surface area of the vanadium pentoxide catalysts of Examples 1 to 6 and Comparative Examples 1 to 6.

FIG. 6 is a graph plotting the absorption edge wavelength of each catalyst listed in Table 5 on the horizontal axis, and plotting the BET specific surface area of each catalyst listed in Table 1 on the vertical axis.

Excluding Comparative Example 1 (Va1ox3-0), a great difference was not found in the BET specific surface areas, even when the absorption edge wavelength changed.

<2.6 Infrared Absorption Spectrum>
(Measurement Method)

The infrared absorption spectrum of each vanadium pentoxide catalyst was measured.

Figure 7A:
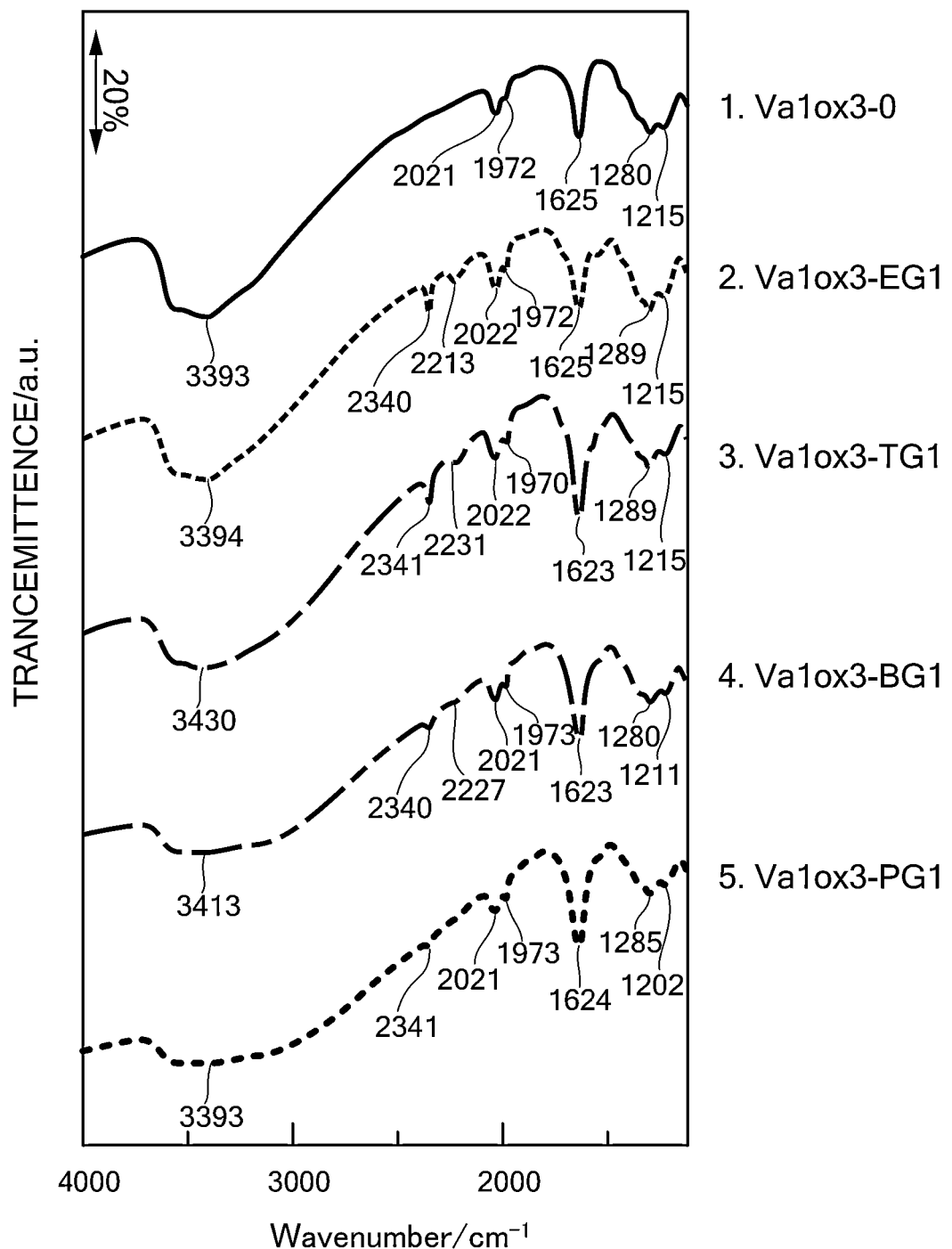
FIG. 7A is a graph showing the infrared absorption spectra in the high wavenumber region of the vanadium pentoxide catalysts of Example 1 and Comparative Examples 1 to 4.
Figure 7B:
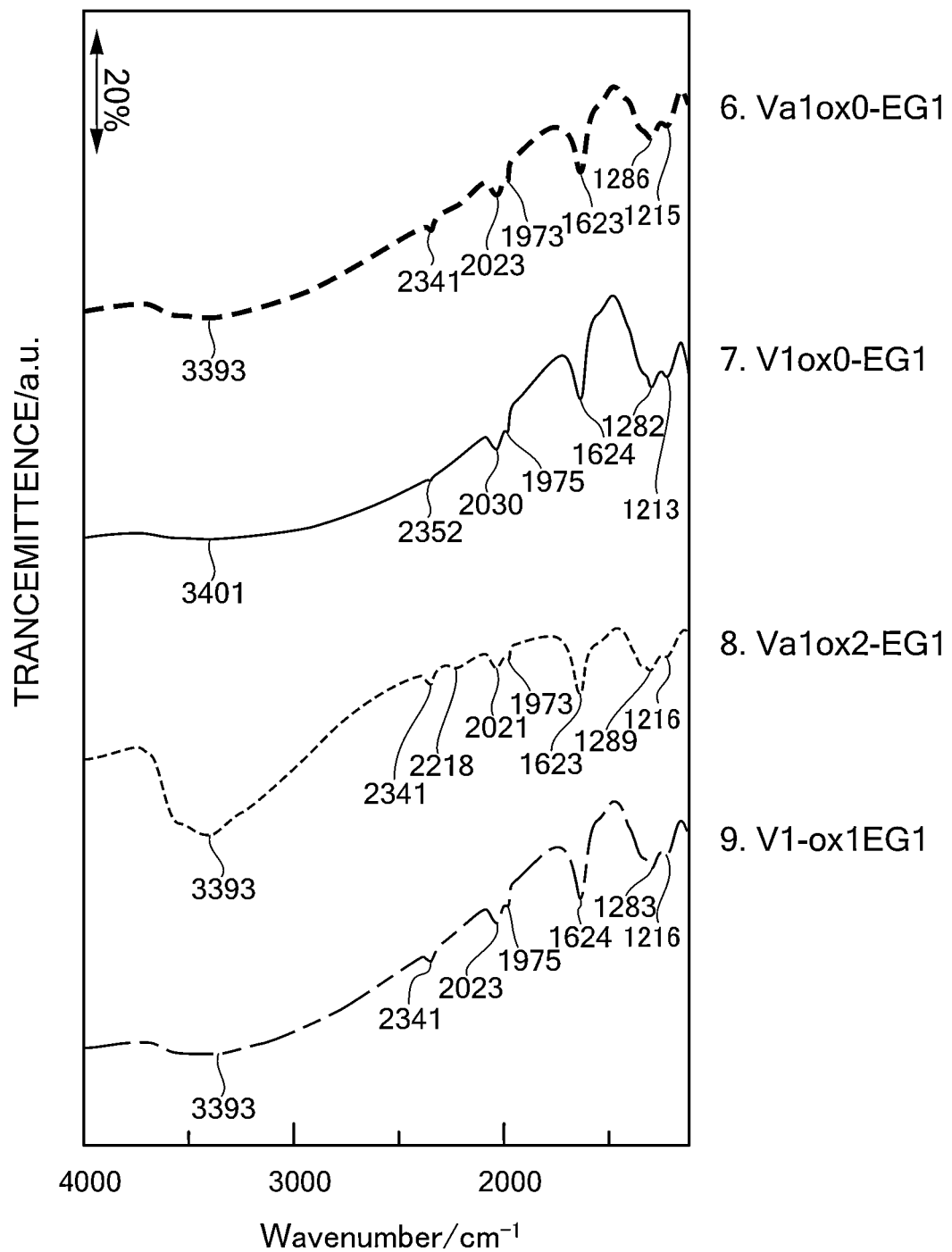
FIG. 7B is a graph showing the infrared absorption spectra in the high wavenumber region of the vanadium pentoxide catalysts of Examples 2 and 3 and Comparative Examples 5 and 6.
Figure 7C:
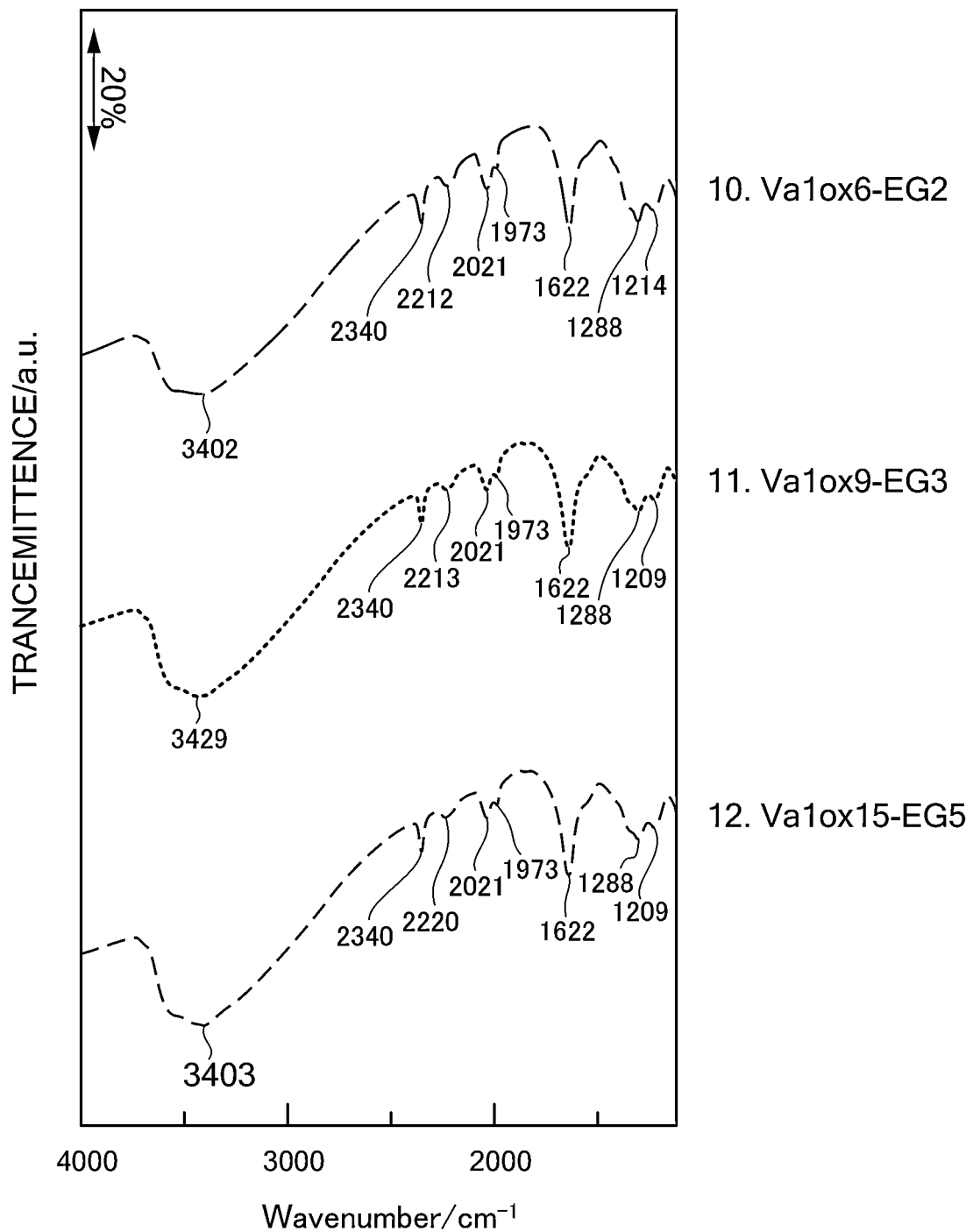
FIG. 7C is a graph showing the infrared absorption spectra in the high wavenumber region of the vanadium pentoxide catalysts of Examples 4 to 6.

FIGS. 7A to 7C show the spectral curves of each catalyst obtained as a result of measuring the infrared absorption spectrum in the high wavenumber region (functional group region: 1150-4000 cm$^{-1}$).

Figure 8A:
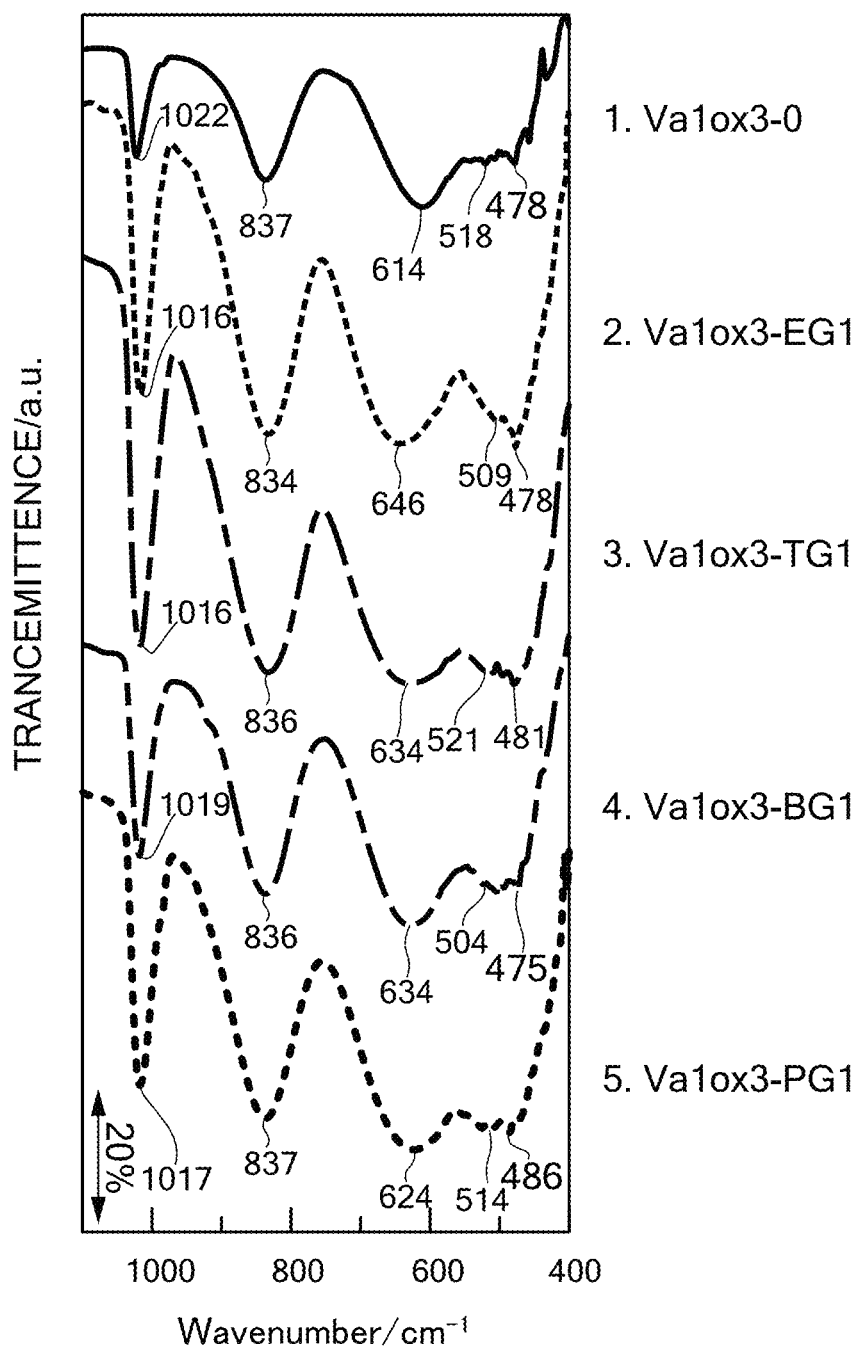
FIG. 8A is a graph showing the infrared absorption spectra in the low wavenumber region of the vanadium pentoxide catalysts of Example 1 and Comparative Examples 1 to 4.
Figure 8B:
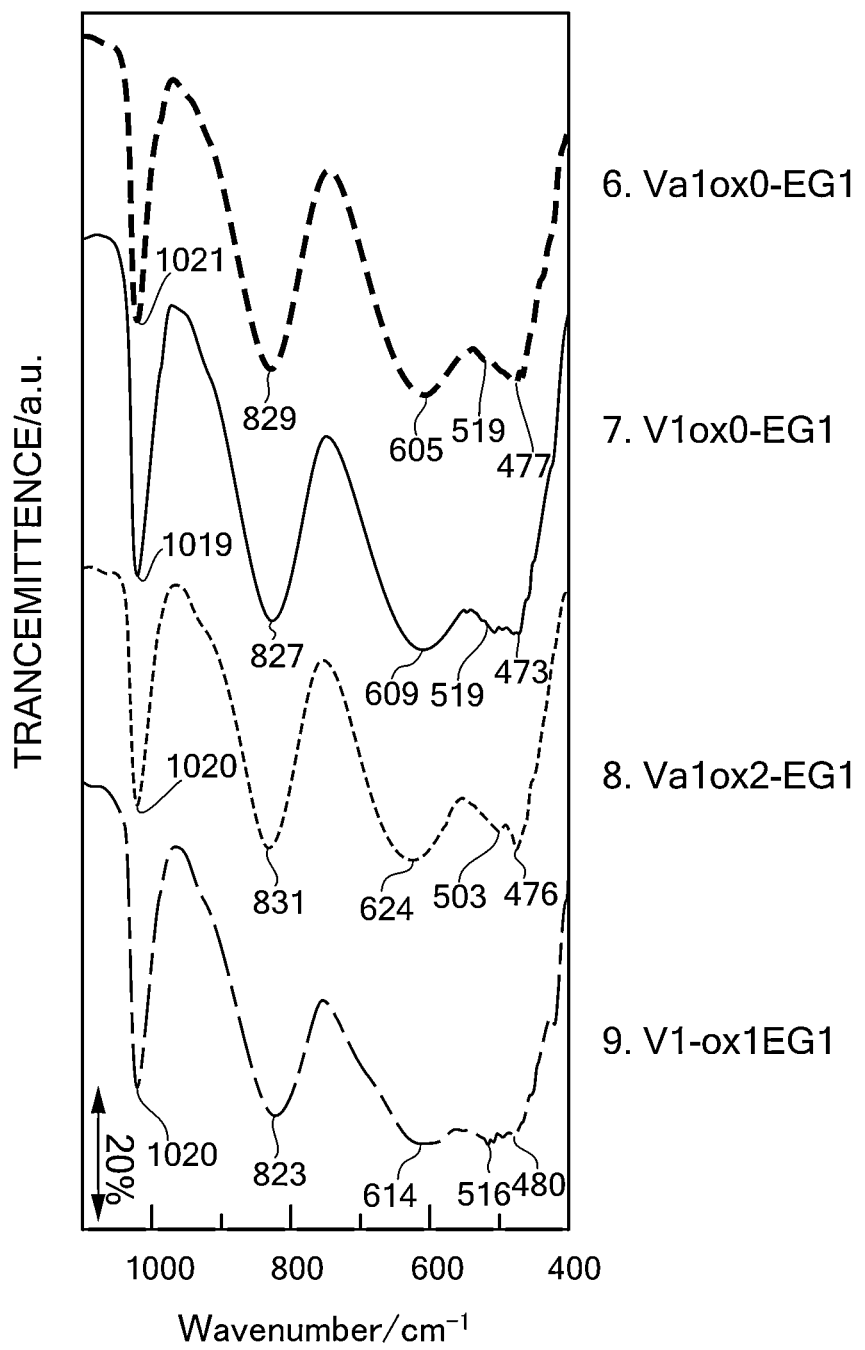
FIG. 8B is a graph showing the infrared absorption spectra in the low wavenumber region of the vanadium pentoxide catalysts of Examples 2 and 3 and Comparative Examples 5 and 6.
Figure 8C:
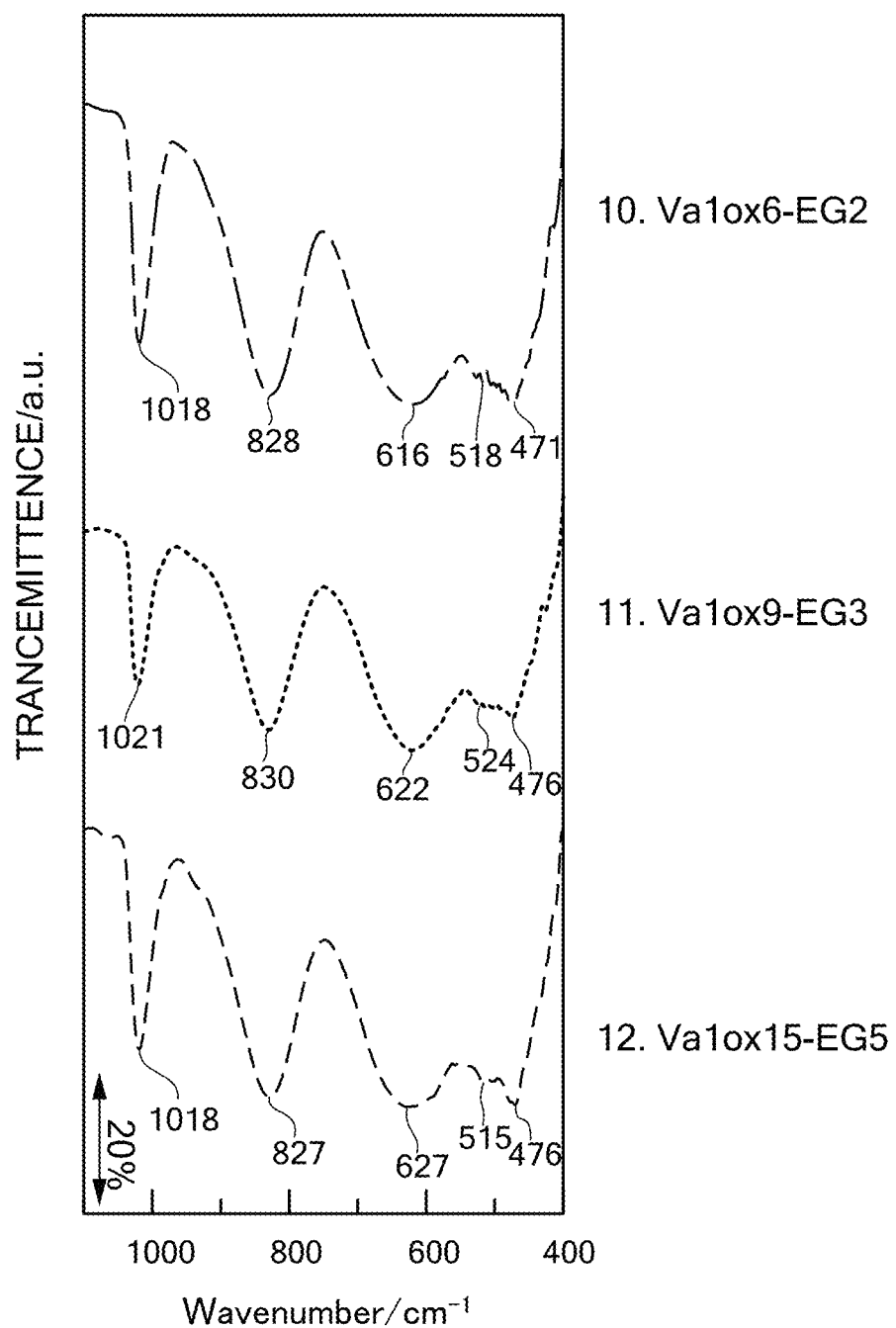
FIG. 8C is a graph showing the infrared absorption spectra in the low wavenumber region of the vanadium pentoxide catalysts of Examples 4 to 6.

In addition, FIGS. 8A to 8C show the spectral curves of each catalyst obtained as a result of measuring the infrared absorption spectrum in the low wavenumber region (finger print region: 1150-400 cm$^{-1}$).

It should be noted that, upon measurement, a 1-mg sample of each vanadium pentoxide catalyst and 10 mg of potassium bromide were mixed, and then molded by pressurizing in a tablet molding machine.

Furthermore, the infrared absorption spectrum was measured by the transmission method using a TGS detector.

As the measurement apparatus, an ET/IR-6100 infrared spectrometer manufactured by JASCO Corporation was used.

(Measurement Results)

As shown in FIGS. 7A to 7C, for catalyst made by converting glycol in the course of manufacturing vanadium pentoxide catalyst, peaks occur in the high wavenumber region, in the region shown by arrows, especially peaks of 2340 cm-1 and 2220 cm$^{-1}$ appear with a catalyst of high NO conversion rate.

These peaks are assumed to be CO and $CO_2$ absorbed in the defect site.

Figure 9:
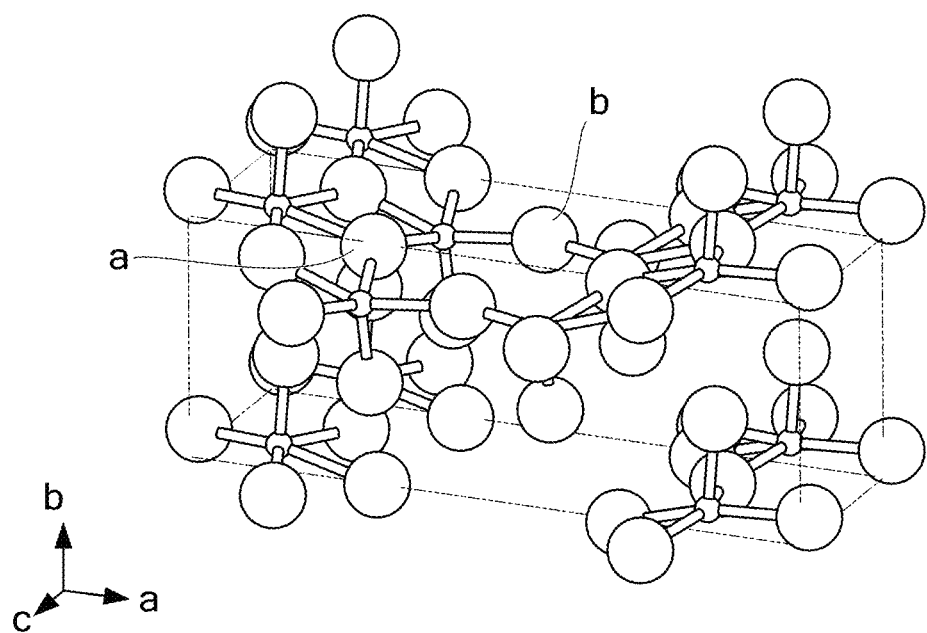
FIG. 9 is a schematic view showing the crystal structure of vanadium pentoxide catalyst.

FIG. 9 shows the crystal structure of vanadium pentoxide. In the crystal structure of vanadium pentoxide, edge-sharing 3V—Oc ((a) in FIG. 9) and crosslinked V—$O_B$—V ((b) in FIG. 9) exist.

In the crystal structure, when the edge-sharing 3V—Oc is scarce and crosslinked V—$O_B$—V is abundant, the absorption of NO tends to occur, and activity increases.

As shown in FIGS. 8A to 8C, in the infrared absorption spectra in the low wavenumber region, the ratio (P1/P2) of the peak intensity P2 of the wavenumber 494 to 549 cm$^{-1}$ originating from the edge-sharing 3V—O$_C$ stretching vibration relative to the peak intensity P1 of the wavenumber 462 to 494 cm$^{-1}$ originating from crosslinked V—O$_B$—V bending vibration changes according to the catalyst.

From this matter, it is suggested to reflect the difference in structure of vanadium oxide for every catalyst.

Above all, this "P1/P2" corresponds to how much defect site at which the oxygen deficiency occurs is generating.

The infrared absorption spectra of FIGS. 8A to 8C were normalized, and the ratio of the transmittance of edge-sharing 3V—O$_C$ relative to the transmittance of crosslinked V—O$_B$—V was calculated as the ratio of the peak intensity P2 relative to the peak intensity P1.

TABLE 6

(Table 6) Ratio of peak intensity

| Sample | | P2 | | P1 | | P1/P2 |
|---|---|---|---|---|---|---|
| | | Wavenumber | Transmittance/% | Wavenumber | Transmittance/% | |
| Comparative Example 1 | (Va1ox3-0) | 518.0 | 48.40 | 478.0 | 48.25 | 0.997 |
| Example 1 | (Va1ox3-EG1) | 509.0 | 45.79 | 478.0 | 40.33 | 0.881 |
| Comparative Example 2 | (Va1ox3-TG1) | 521.0 | 46.71 | 481.0 | 44.74 | 0.958 |
| Comparative Example 3 | (Va1ox3-BG1) | 504.0 | 41.55 | 475.0 | 42.14 | 1.014 |
| Comparative Example 4 | (Va1ox3-PG1) | 514.0 | 42.05 | 486.0 | 41.58 | 0.989 |
| Example 2 | (Va1ox0-EG1) | 519.0 | 42.89 | 477.0 | 38.57 | 0.899 |
| Comparative Example 5 | (V1ox0-EG1) | 508.2 | 41.49 | 471.5 | 41.11 | 0.991 |
| Example 3 | (Va1ox2-EG1) | 503.0 | 45.01 | 476.0 | 40.55 | 0.901 |
| Comparative Example 6 | (V1ox1-EG1) | 516.0 | 39.79 | 480.0 | 40.94 | 1.029 |
| Example 4 | (Va1ox6-EG2) | 518.0 | 41.79 | 471.0 | 37.11 | 0.888 |
| Example 5 | (Va1ox9-EG3) | 524.0 | 43.55 | 476.0 | 39.30 | 0.902 |
| Example 6 | (Va1ox15-EG5) | 515.0 | 42.90 | 471.0 | 37.34 | 0.870 |

Table 6 shows the above transmittance ratios of Examples 1 to 6 and Comparative Examples 1 to 6.

The value of transmittance shown in Table 6 becomes smaller as the peaks in FIGS. 8A to 8C become convex downwardly.

For example, the transmittance of this peak becomes smaller as the peak on the low wavenumber side P1 (462 to 494 cm$^{-1}$) returned to the crosslinked V—O$_B$—V bulges out downwardly.

According to Table 6, the ratio (P1/P2) of the peak intensity P2 relative to the peak intensity P1 of the Examples of the present invention can be quantified as 0.98 or less.

(Relationship Between Infrared Absorption Spectrum and Catalyst Activity)

Figure 10A:
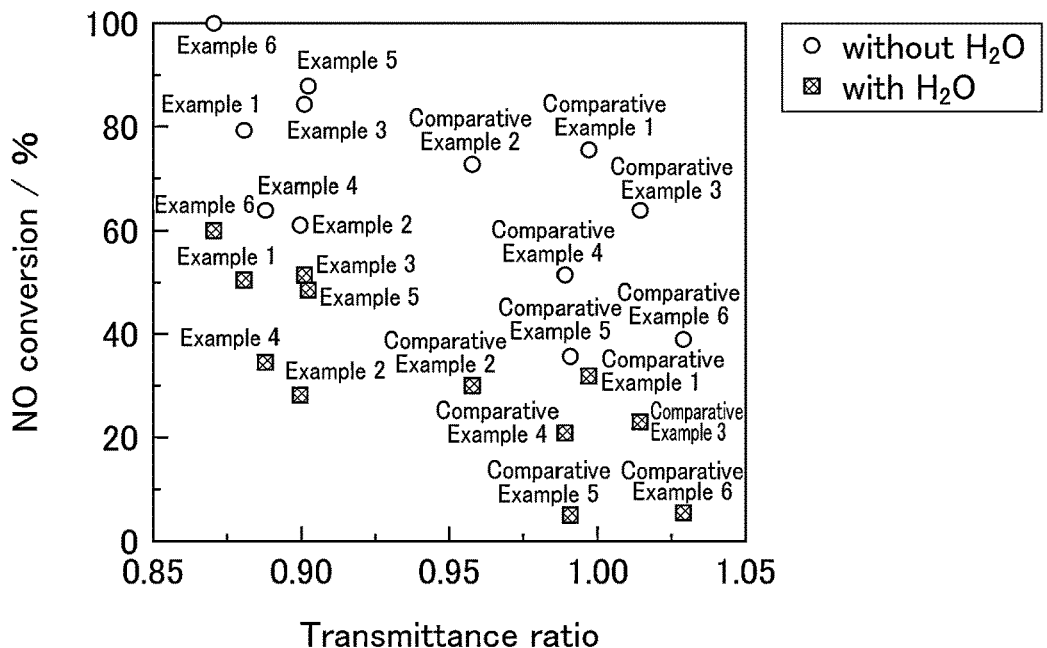
FIG. 10A is a graph showing the relationship between the infrared absorption spectra (transmittance ratio) and NO conversion rate of the vanadium pentoxide catalysts of Examples 1 to 6 and Comparative Examples 1 to 6.

FIG. 10A is a graph plotting the ratio of this transmittance on the horizontal axis, and plotting the NO conversion rate of each catalyst listed in FIG. 1 on the vertical axis.

It is shown that the NO conversion rate rises together with a decrease in the ratio of transmittance.

From this fact, it is suggested that the activity improves as the proportion of edge-sharing 3V—O$_C$ becomes smaller.

Figure 10B:
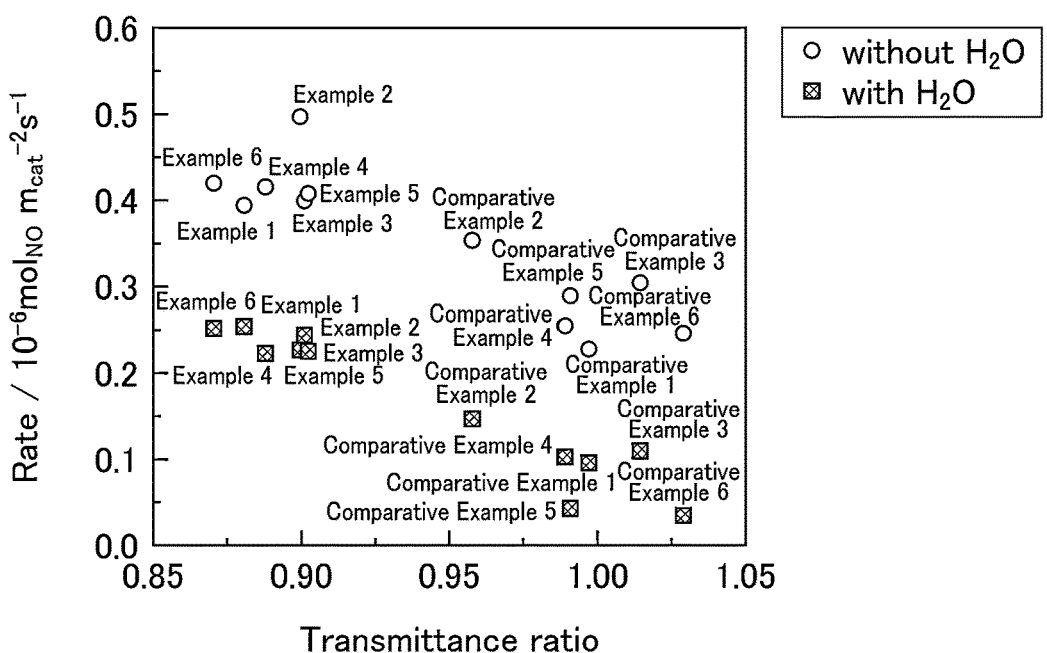
FIG. 10B is a graph showing the relationship between the infrared absorption spectra (transmittance ratio) and reaction rate of the vanadium pentoxide catalysts of Examples 1 to 6 and Comparative Examples 1 to 6.

FIG. 10B is a graph plotting the above-mentioned transmittance on the horizontal axis, and plotting the reaction rate per specific surface area of each catalyst listed in FIG. 2 on the vertical axis. It is shown that the reaction rate per specific surface area rises together with a decrease in transmittance ratio.

From this fact as well, it is suggested that the activity improves as the proportion of edge-sharing 3V—O$_C$ becomes smaller.

According to both graphs, the transmittance ratio of the Examples of the present invention can be quantified as 0.98 or less.

It should be noted that the above-mentioned transmittance ratio serves as an index of defect sites.

<2.7 TEM Images>

Figure 11A:
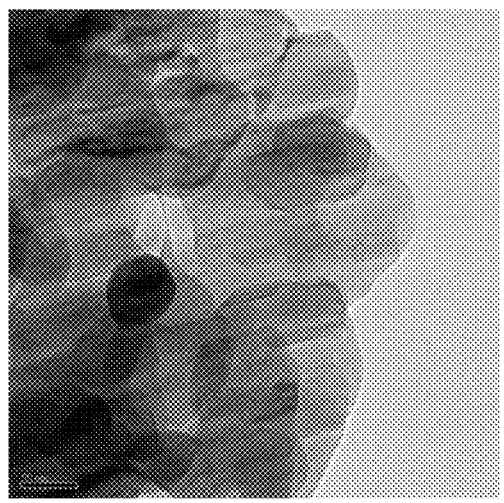
FIG. 11A is a TEM image of the vanadium pentoxide catalyst of Comparative Example 1.
Figure 11B:
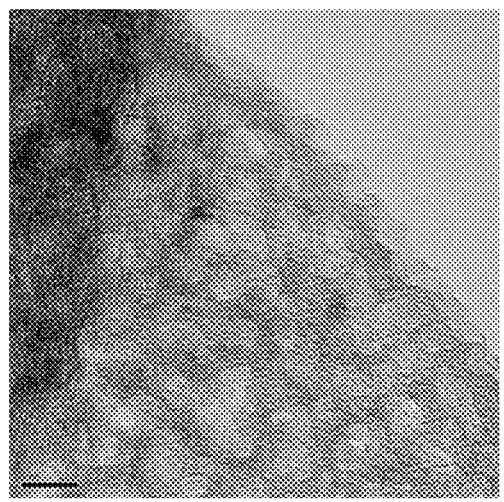
FIG. 11B is a TEM image of the vanadium pentoxide catalyst of Comparative Example 1.

FIGS. 11A and 11B show TEM images of Comparative Example 1 (Va1ox3-0).

It should be noted that FIG. 11A is a TEM image of 140,000 times magnification, and FIG. 11B is a TEM image of 1,400,000 times magnification.

Figure 11C:
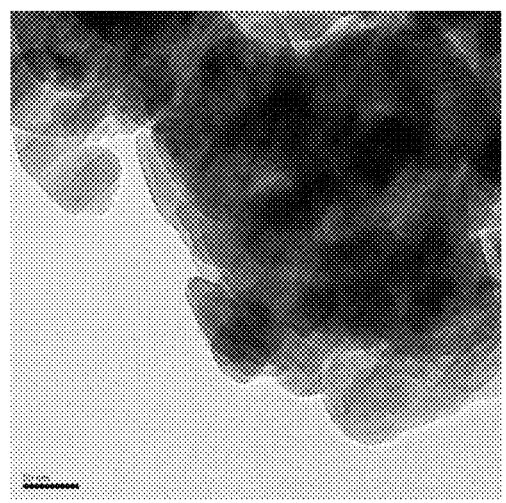
FIG. 11C is a TEM image of the vanadium pentoxide catalyst of Example 1.
Figure 11D:
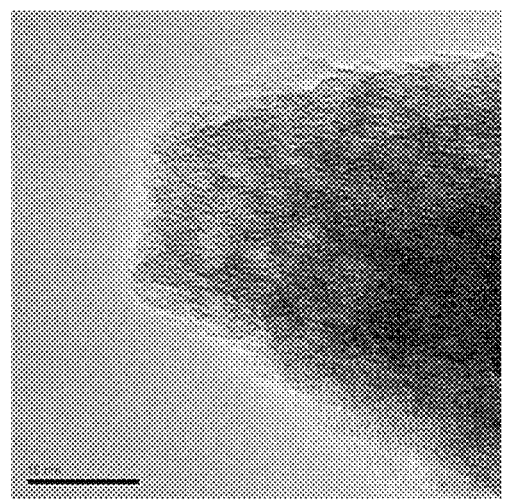
FIG. 11D is a TEM image of the vanadium pentoxide catalyst of Example 1.

On the other hand, FIGS. 11C and 11D show TEM images of Example 1 (Va1ox3-EG1).

It should be noted that FIG. 11C is a TEM image of 140,000 times magnification, and FIG. 11D is a TEM image of 1,400,000 times magnification.

As found from these images, there is no change in the morphology from the presence/absence of addition of ethylene glycol.

<2.8 X-Ray Photoelectron Spectrum (XPS) Measurement>

(Measurement Method)

For Comparative Example 1 (Va1ox3-0), Example 1 (Va1ox3-EG1), Comparative Example 2 (Va1ox3-TG1), Comparative Example 3 (Va1ox3-BG1), and Comparative Example 4 (Va1ox3-PG1), the X-ray photoelectron spectrum (XPS) was measured in order to analyze the electronic state. In more detail, powder samples of each catalyst of the Examples and Comparative Examples were fixed to a sample holder using carbon tape, and the X-ray photoelectron spectrum was measured.

As the measurement device, a JPS-9010MX photoelectron spectrometer manufactured by JEOL Ltd. was used.

(Measurement Results)

Figure 12:
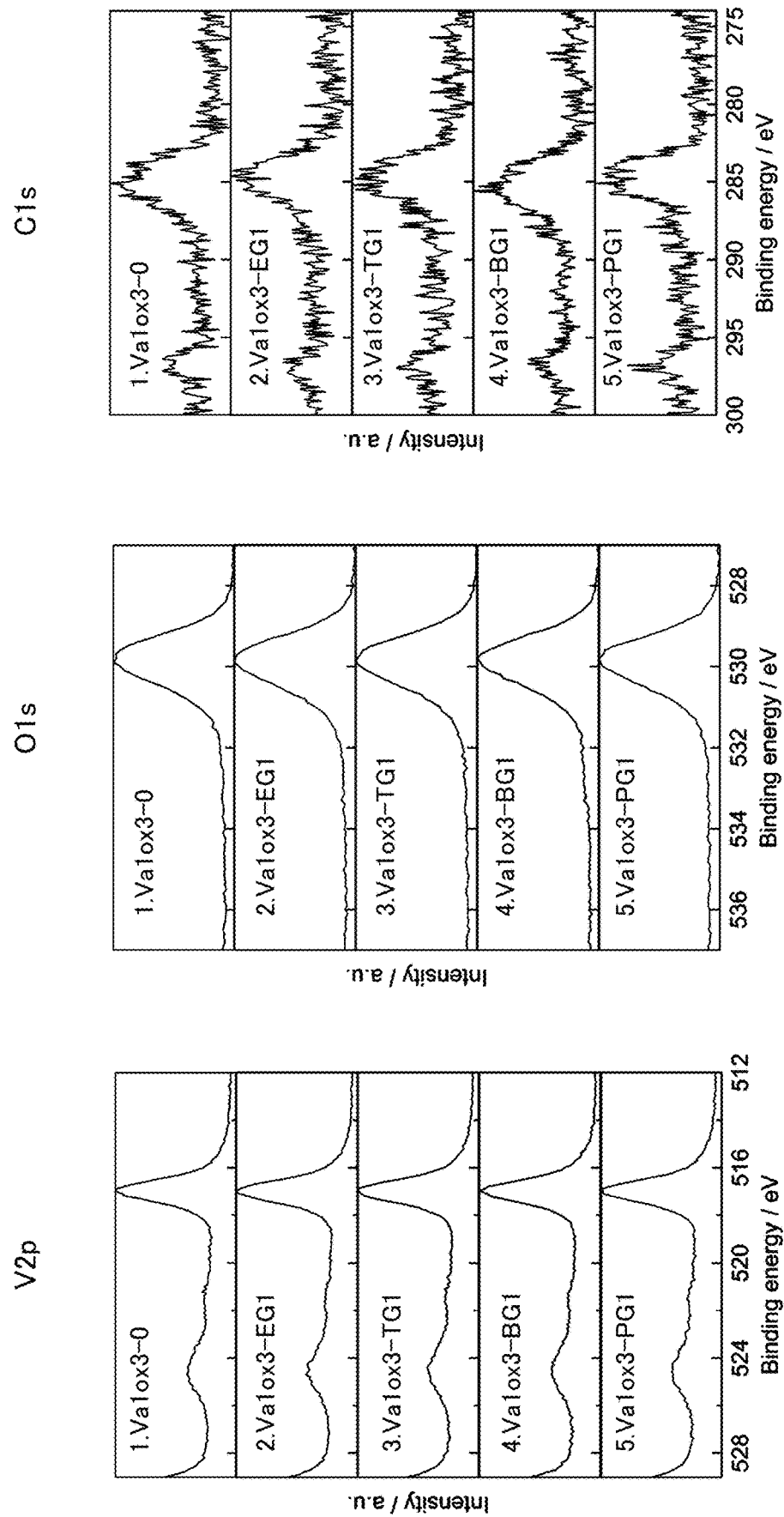
FIG. 12 is a graph showing X-ray photoelectron spectra (XPS) of the vanadium pentoxide catalysts of Example 1 and Comparative Examples 1 to 4.

FIG. 12 shows the XPS spectra of the V2p, O1s and C1s regions. A clear change in electronic state for every catalyst was not confirmed.

<2.9 Water Adsorption Amount>
(Measurement Method)

Adsorption isotherms were obtained for Examples 1 to 6 and Comparative Examples 1 to 6.

In other words, the equilibrium adsorption amount of water adsorbed to each catalyst under constant temperature was measured while changing the relative pressure.

More specifically, powder of the catalyst of each Example and each Comparative Example was encapsulated in a sample holder, and measurement was performed using a Belsorp-maxk manufactured by BELCAT. It should be noted that, herein, "relative pressure" indicates a ratio of the adsorption equilibrium pressure relative to the saturated vapor pressure, and is a value of 0 to 1.

(Measurement Method)

Figure 13:
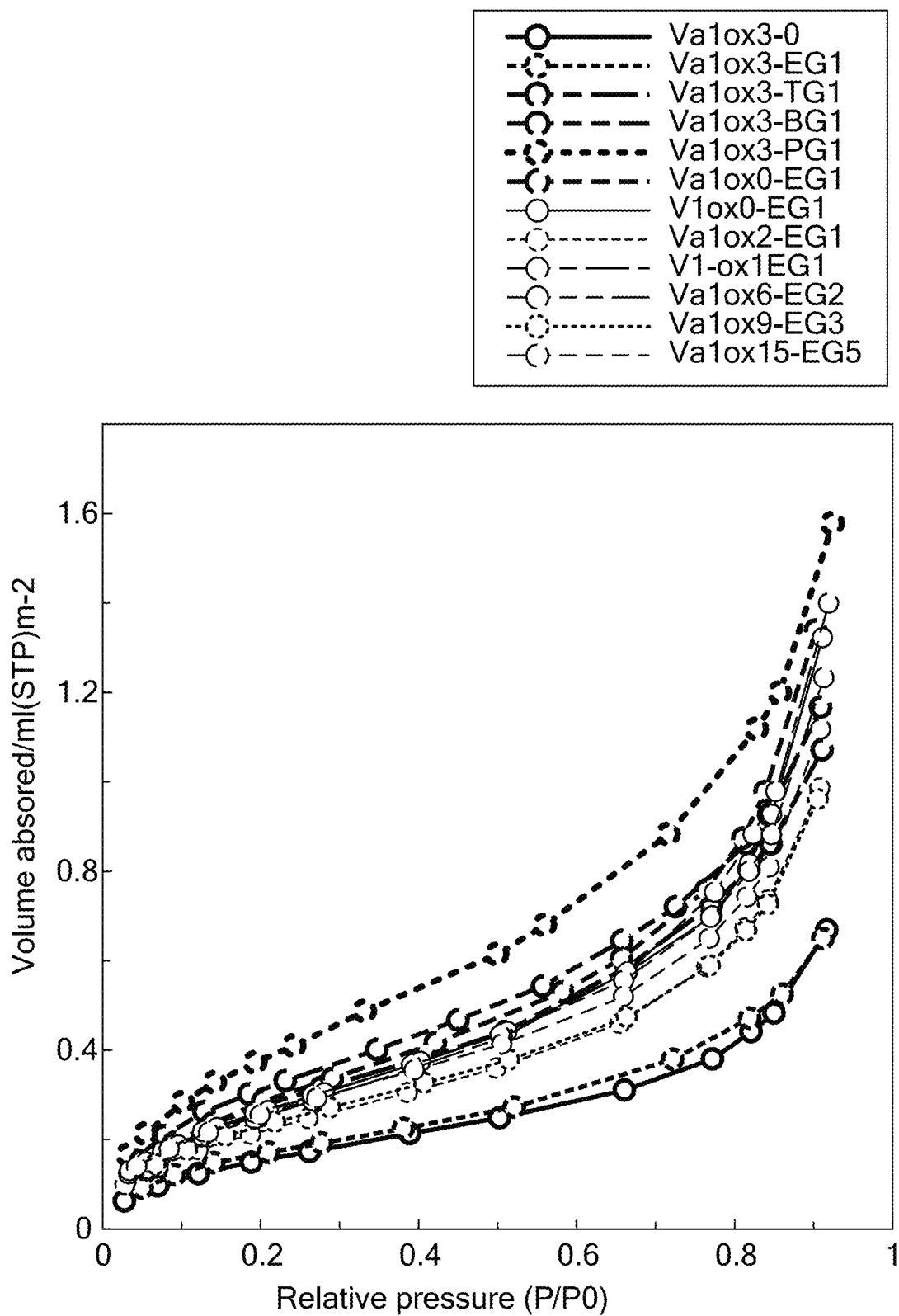
FIG. 13 is a graph showing the adsorption isotherm of water of the vanadium pentoxide catalysts of Examples 1 to 6 and Comparative Examples 1 to 6.
Figure 14:
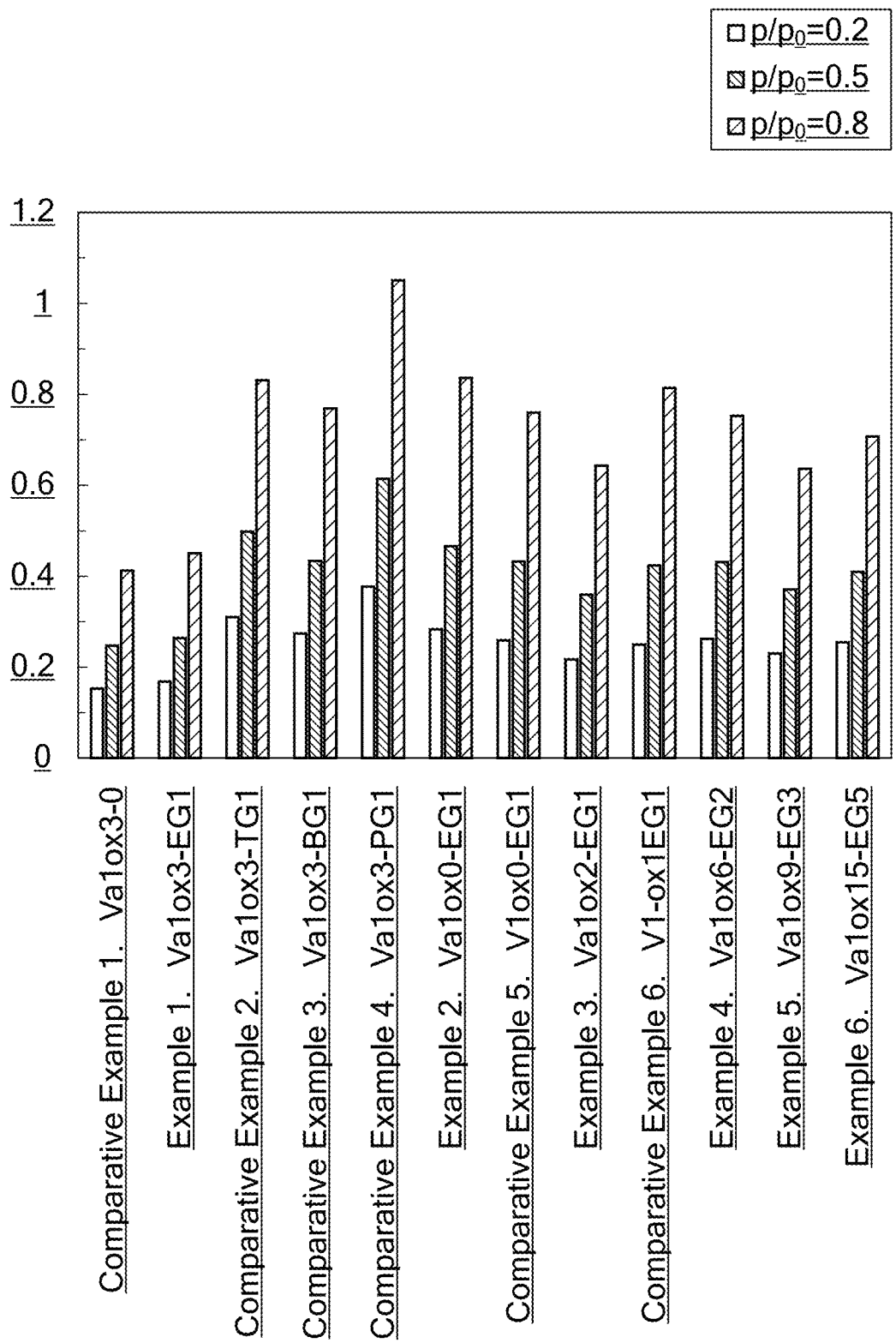
FIG. 14 is a graph showing the water absorption amount of the vanadium pentoxide catalysts of Examples 1 to 6 and Comparative Examples 1 to 6.

FIG. 13 shows the adsorption isotherm of water of each catalyst. FIG. 14 shows the adsorption amount of water of each catalyst for the respective absolute pressures $p/p_0$ of 0.2, 0.5 and 0.8.

In both FIGS. 13 and 14, the correlation between the adsorption amount of water and the synthesis method was not shown.

(Relationship Between Water Adsorption Amount and Catalyst Activity)

Figure 15A:
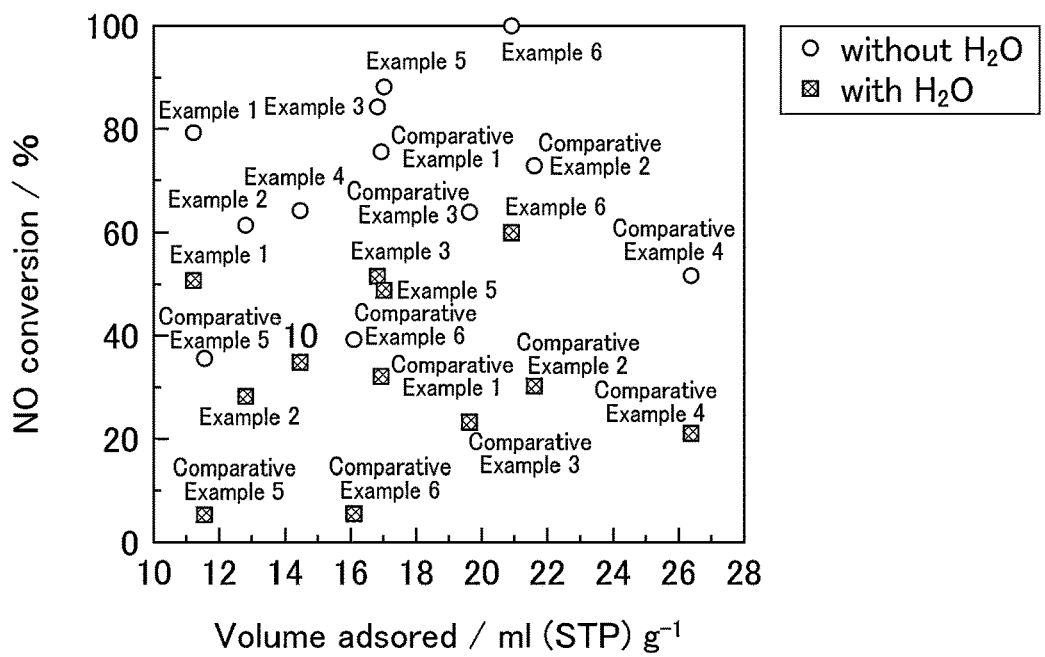
FIG. 15A is a graph showing the relationship between the water absorption amount and NO conversion rate of the vanadium pentoxide catalysts of Examples 1 to 6 and Comparative Examples 1 to 6.

FIG. 15A is a graph plotting the water adsorption amount of each catalyst for absolute pressure $p/p_0=0.8$ on the horizontal axis, and plotting the NO conversion rate of each catalyst listed in FIG. 1 on the vertical axis.

A correlation between the water adsorption amount and NO conversion rate was not found.

Figure 15B:
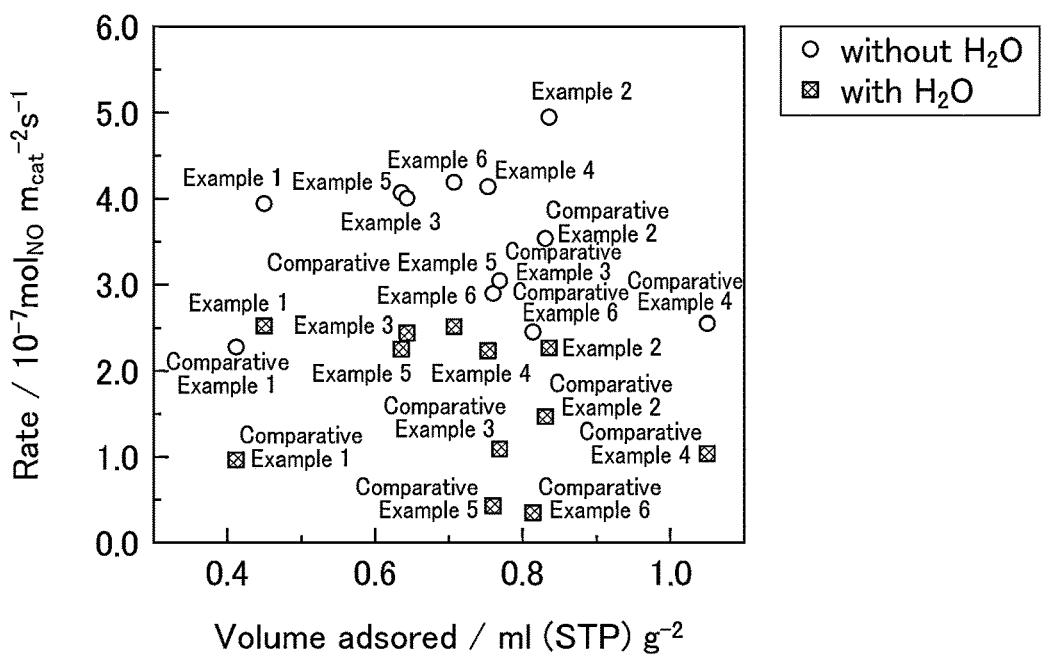
FIG. 15B is a graph showing the relationship between the water absorption amount and reaction rate of the vanadium pentoxide catalysts of Examples 1 to 6 and Comparative Examples 1 to 6.

FIG. 15B is a graph plotting the water adsorption amount of each catalyst for absolute pressure $p/p_0=0.8$ on the horizontal axis, and plotting the reaction rate per specific surface area of each catalyst listed in FIG. 2 on the vertical axis.

A correlation between the water adsorption amount and reaction rate per specific surface area was not found.

<2.10 Raman Spectra>
(Measurement Method)

In order to analyze the crystal structure of each vanadium pentoxide catalyst, the Raman spectra was measured by Raman spectroscopy.

(Measurement Results)

Figure 16:
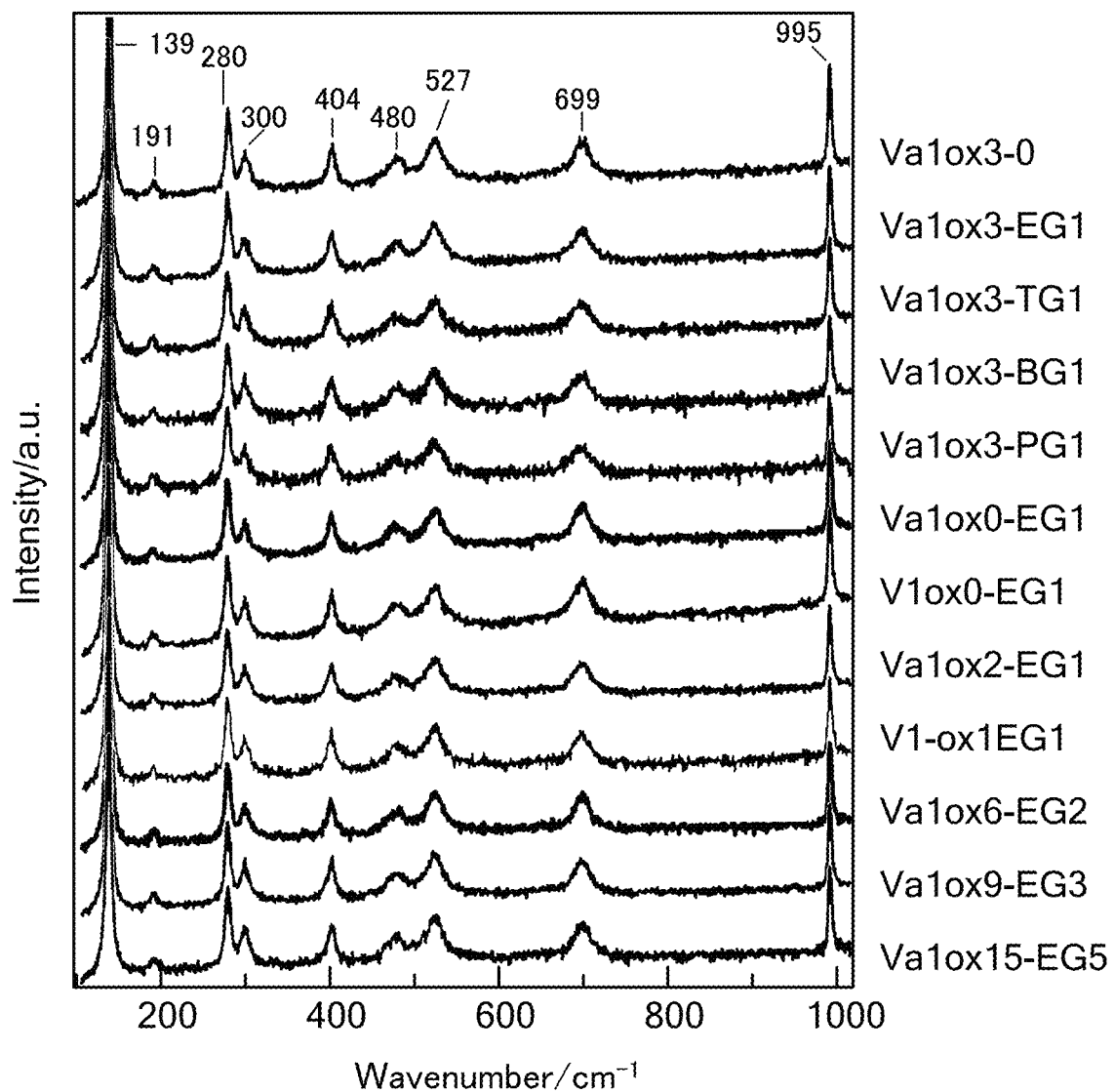
FIG. 16 is a graph showing the Raman spectra of the vanadium pentoxide catalysts of Examples 1 to 6 and Comparative Examples 1 to 6.

FIG. 16 shows the Raman spectra of each catalyst. From FIG. 16, the peaks originating from the crystal structure of each catalyst could be confirmed.

On the other hand, the peak originating from the defect mode, etc. did not appear.

In the above way, for a denitration catalyst containing vanadium oxide, and having a carbon content of at least 0.05 wt %, the denitration efficiency at a low temperature of 270° C. or lower is high in the selective catalytic reduction reaction with ammonia as the reductant, using the denitration catalyst of the present invention having a defect site at which the oxygen deficiency occurs in the crystal structure.

3 Application Examples

<3.1 Combustion System>
<3.1.1 First Combustion System>

Figure 17:
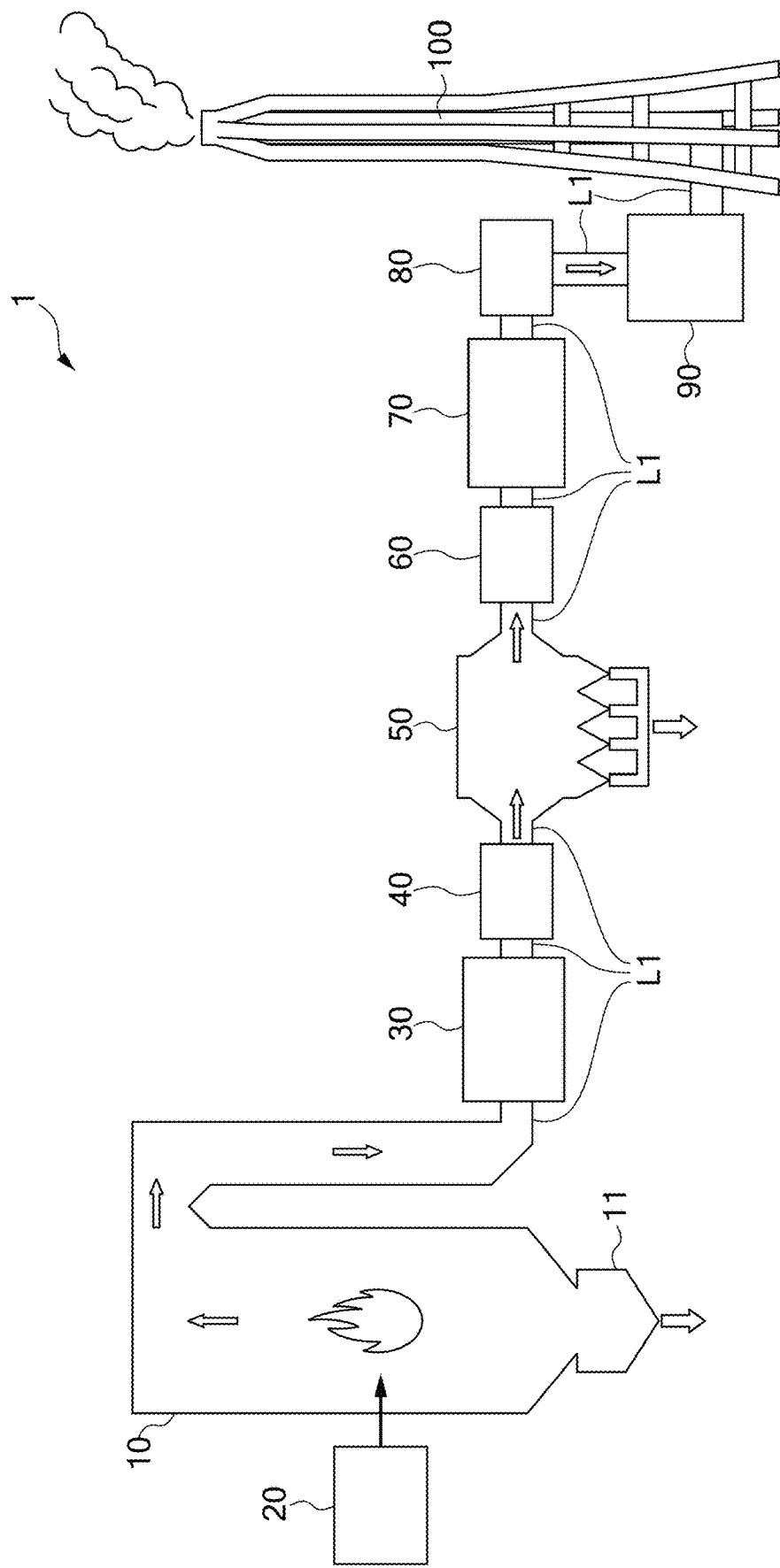
FIG. 17 is a view showing the configuration of a combustion system according to a first application example of the present invention.

Hereinafter, a first application example of the present invention will be explained while referencing the drawings. FIG. 17 is a view showing the configuration of a combustion system 1 according to the first application example.

The combustion system 1 is a combustion system establishing pulverized coal as the fuel.

As shown in FIG. 17, the combustion system 1 assumes a thermal power generation system as an example, and includes: a boiler 10 as a combustion device, a coal pulverizer 20, an exhaust channel L1, an air preheater 30, a gas heater 40 as a heat recovery device, a dust collector 50, an induced-draft fan 60, desulfurization equipment 70, a gas heater 80 as a heater, a denitration device 90, and a smoke stack 100.

The boiler 10 combusts the pulverized coal as fuel together with air.

In the boiler 10, exhaust gas is produced by the pulverized coal combusting.

It should be noted that coal ash such as clinker ash and fly ash is produced by pulverized coal combusting.

The clinker ash produced in the boiler 10 is discharged to the clinker hopper 11 arranged below the boiler 10, and is then carried to a coal ash collection silo which is not illustrated.

The boiler 10 is formed in a substantially reversed U-shape as a whole.

The exhaust gas produced in the boiler 10 moves in reverse U shape along the shape of the boiler 10.

The temperature of the exhaust gas near the outlet of the exhaust gas of the boiler 10 is 300 to 400° C., for example.

The coal pulverizer 20 forms pulverized coal by crushing coal supplied from the coal hopper which is not illustrated, into a fine particle size.

The coal pulverizer 20 preheats and dries the pulverized coal, by mixing the pulverized coal and air.

The pulverized coal formed in the coal pulverizer 20 is supplied to the boiler 10 by air being blown.

The exhaust channel L1 has an upstream side connected to the boiler 10.

The exhaust channel L1 is a flow path through which the exhaust gas produced in the boiler 10 flows.

The air preheater 30 is arranged in the exhaust channel L1.

The air preheater 30 performs heat exchange between the exhaust gas and air used for combustion fed from a pusher-type blower which is not illustrated, and recovers heat from the exhaust gas.

The air for combustion is supplied to the boiler 10 after being heated in the air preheater 30.

The gas heater 40 is arranged on the downstream side of the air preheater 30 in the exhaust channel L1.

Exhaust gas which was heat recovered in the air preheater 30 is supplied to the gas heater 40.

The gas heater 40 further recovers heat from the exhaust gas.

The dust collector 50 is arranged on the downstream side of the gas heater 40 in the exhaust channel L1.

The exhaust gas which was heat recovered in the gas heater 40 is supplied to the dust collector 50.

The dust collector 50 is a device which collects dust such as coal ash (fly ash) in the exhaust gas by applying voltage to electrodes.

Fly ash collected in the dust collector 50 is carried to a coal ash collection silo which is not illustrated.

The temperature of exhaust gas in the dust collector 50 is 80 to 120° C., for example.

The induced-draft fan 60 is arranged on the downstream side of the dust collector 50 in the exhaust channel L1.

The induced-draft fan 60 draws in exhaust gas from which fly ash was removed in the dust collector 50 from a first side and sends out to a second side.

The desulfurization equipment 70 is arranged on the downstream side of the induced-draft fan 60 in the exhaust channel L1.

The exhaust gas sent out from the induced-draft fan 60 is supplied to the desulfurization equipment 70.

The desulfurization equipment 70 removes sulfur oxides from the exhaust gas.

In detail, the desulfurization equipment 70 removes sulfur oxides from the exhaust gas, by absorbing sulfur oxides contained in the exhaust gas into a mixed solution, by spraying mixed solution (limestone slurry) of limestone and water to the exhaust gas.

The temperature of exhaust gas in the desulfurization device 70 is 50 to 120° C., for example.

The gas heater 80 is arranged on the downstream side of the desulfurization device 70 in the exhaust channel L1.

The exhaust gas from which the sulfur oxides were removed in the desulfurization equipment 70 is supplied to the gas heater 80.

The gas heater 80 heats the exhaust gas.

The gas heater 40 and gas heater 80 may be configured as gas-gas heaters performing heat exchange between exhaust gas flowing between the air preheater 30 and the dust collector 50 in the exhaust channel L1, and exhaust gas flowing between the desulfurization equipment 70 and denitration device 90 described later.

Above all, the gas heater 80 heats the exhaust gas up to a temperature suited to the denitration reaction of the denitration device 90 at a later stage.

The denitration device 90 is arranged on the downstream side of the gas heater 80 in the exhaust channel L1.

The exhaust gas heated in the gas heater 80 is supplied to the denitration device 90.

The denitration device 90 removes nitrogen oxides from the exhaust gas by way of the denitration catalyst.

The denitration device 90 uses a denitration catalyst containing vanadium oxide, having a carbon content of at least 0.05 wt %, and having a defect site at which an oxygen deficiency occurs in the crystal structure.

The temperature of exhaust gas in the denitration device 90 is 130 to 200° C., for example.

The denitration device 90 removes nitrogen oxides from exhaust gas by a selective catalytic reduction process.

According to the selective catalytic reduction process, it is possible to remove nitrogen oxides efficiently from exhaust gas, by generating nitrogen and water from the nitrogen oxides by reductant and the above-mentioned denitration catalyst.

The reductant used in the selective catalytic reduction process contains at least one of ammonia and urea.

In the case of using ammonia as the reductant, ammonia in any state of ammonia gas, liquid ammonia and ammonia aqueous solution may be used.

More specifically, the denitration device 90 can be a configuration which injects ammonia gas to the introduced exhaust gas, and then contacts this mixed gas with the denitration catalyst.

For this reason, the denitration device 90 includes one or a plurality of denitration catalyst layers, and these denitration catalyst layers may include a plurality of casings, a plurality of honeycomb catalysts accommodated in this plurality of casing, and a sealing member.

In more detail, the casing is configured from a square tubular metal member in which one end and the other end are open, and may be arranged so that the opened one end and other end are opposite in the flow path of the exhaust gas in the denitration reactor, i.e. so that exhaust gas flows inside of the casing.

In addition, the plurality of casings may be arranged to be connected in an abutted state so as to block the flow path of exhaust gas.

The honeycomb catalyst may be formed in a long shape (rectangular parallelepiped shape) in which a plurality of exhaust gas circulation holes extending in the longitudinal direction is formed, and may be arranged so that the extending direction of exhaust gas circulation holes follows the flow path of exhaust gas.

The smoke stack 100 has a downstream side of the exhaust channel L1 connected.

The exhaust gas from which nitrogen oxides were removed in the denitration device 90 is introduced to the smoke stack 100.

The exhaust gas introduced to the smoke stack 100 is effectively discharged from the top of the smoke stack 100 by the stack effect, by being heated by the gas heater 80.

In addition, by the exhaust gas being heated in the gas heater 80, it is possible to prevent water vapor from condensing above the smoke stack 100 and white smoke generating.

The temperature of exhaust gas near the outlet of the smoke stack 100 is 110° C., for example.

<3.1.2 Second Combustion System>

Figure 18:
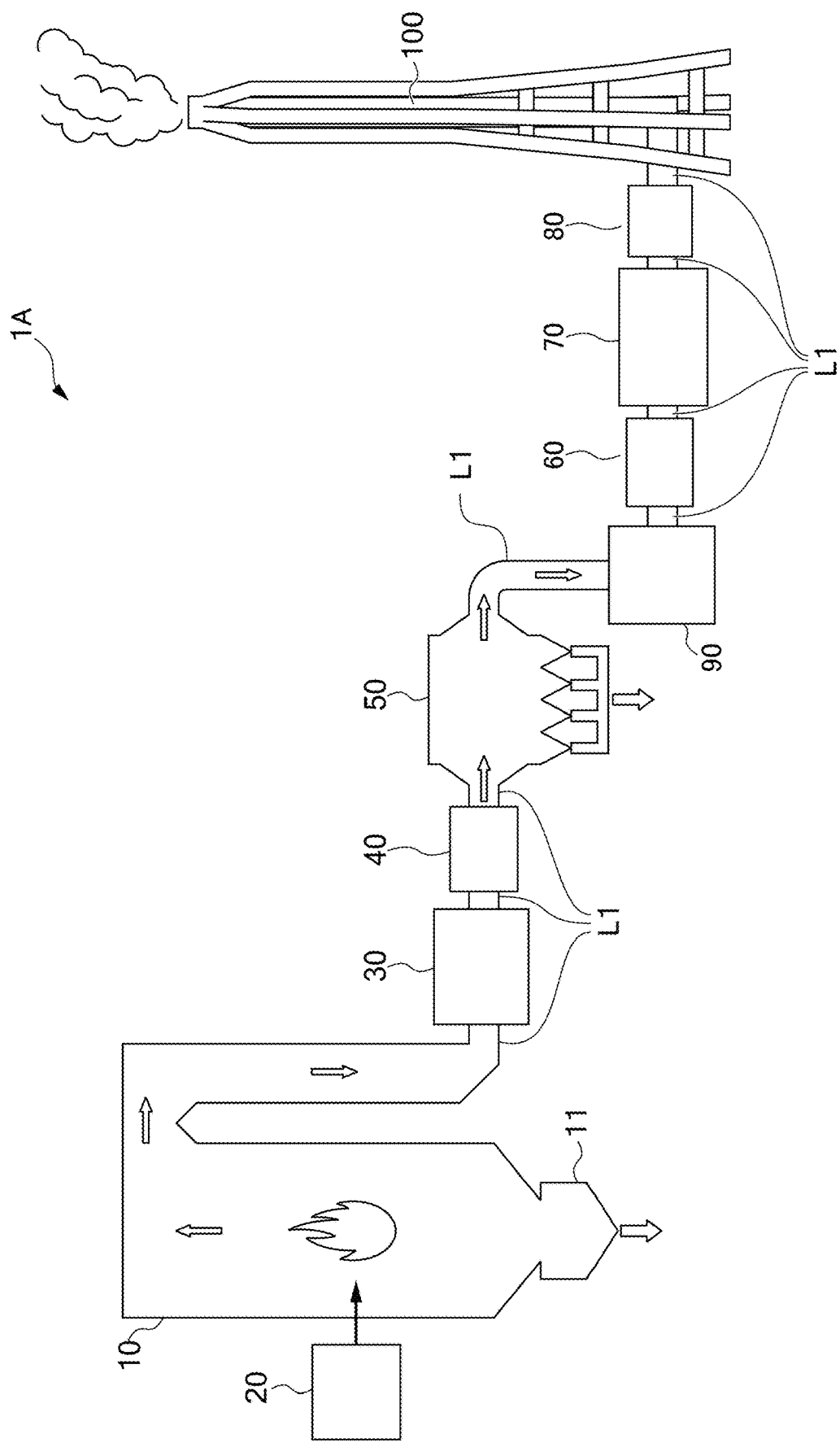
FIG. 18 is a view showing the configuration of a combustion system according to a second application example of the present invention.

FIG. 18 is a view showing the configuration of a combustion system 1A according to a second application example.

The combustion system 1A is a combustion system establishing pulverized coal as fuel, similarly to the combustion system 1.

In the combustion system 1A, for constituent elements identical to the combustion system 1, the same reference numbers are used, and explanations of the functions thereof will be omitted.

The combustion system 1A differs from the combustion system 1 in the point of the denitration device 90 being installed immediately after the dust collector 50.

Furthermore, the induced-draft fan 60, desulfurization equipment 70, and a gas heater 80 are provided in order from upstream at the downstream of the denitration device 90.

The gas heater 80 in the combustion system 1 heats the exhaust gas up to the temperature suited to the denitration reaction of the denitration device 90 of a later stage.

On the other hand, the gas heater 80 of the combustion system 1A heats the exhaust gas up to the suitable temperature to diffuse from the smoke stack 100 at a later stage.

By installing the denitration device 90 immediately after the dust collector 50, it is possible to set the temperature of exhaust gas in the denitration device 90 as 130 to 200° C., without requiring to provide a gas heater before the denitration device 90.

<3.1.3 Third Combustion System>

Figure 19:
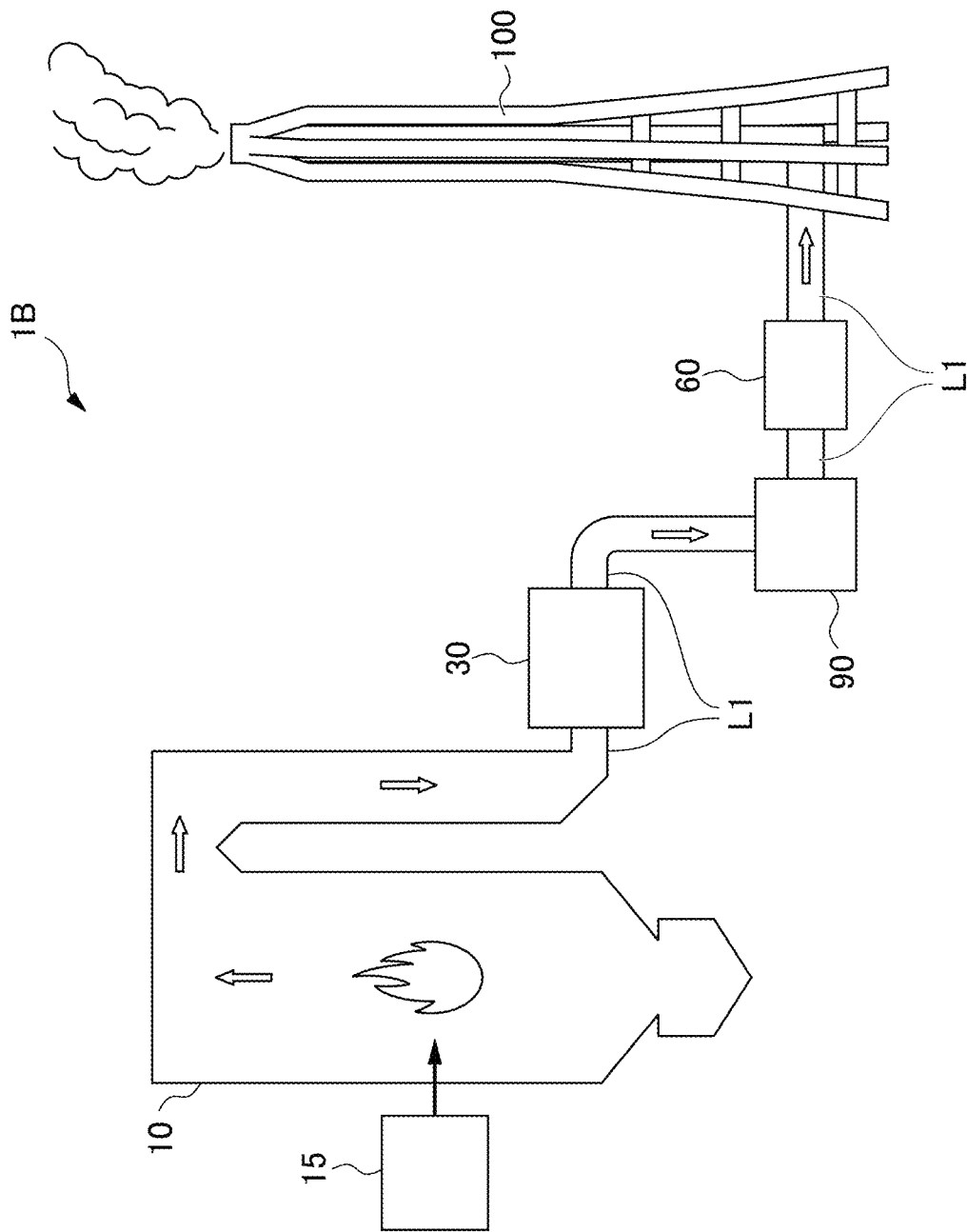
FIG. 19 is a view showing the configuration of a combustion system according to a third application example of the present invention.

FIG. 19 is a view showing the configuration of a combustion system 1B according to a third application example.

The combustion system 1B differs from the combustion systems 1 and 1A, and is a combustion system establishing natural gas as the fuel.

In the combustion system 1B, for constituent elements identical to the combustion system 1 and the combustion system 1A, the same reference numbers are used, and explanations of the functions thereof will be omitted.

As shown in FIG. 19, the combustion system 1B includes the boiler 10 as a combustion device, a vaporizer 15 of natural gas, the exhaust channel L1, the air preheater 30, the denitration device 90, the induced-draft fan 60, and the smoke stack 100.

On the other hand, the combustion system 1B does not establish the dust collector and desulfurization equipment as essential constituent elements.

The vaporizer 15 vaporizes natural gas supplied from an LNG tank which is not illustrated and supplies to the boiler 10.

Upon vaporizing, a system using seawater (open rack system) may be used, a system making hot water by heating with a gas burner (submerged combustion system) may be used, or a system performing heat exchange of a plurality of stages using a mediator may be used.

The denitration device 90 is arranged on the downstream side of the air preheater 30 in the exhaust channel L1.

Exhaust gas cooled in the air preheater 30 is supplied to the denitration device 90.

The denitration device 90 removes nitrogen oxides from the exhaust gas by the denitration catalyst.

The temperature of each gas in the denitration device 90 is 130 to 200° C., for example.

The downstream side of the exhaust channel L1 is connected to the smoke stack 100.

Exhaust gas from which nitrogen oxides were removed in the denitration device 90 is introduced to the smoke stack 100.

Due to the temperature of the exhaust gas in the denitration device 90 being 130 to 200° C., for example, the exhaust gas introduced to the smoke stack 100 is effectively discharged from the top of the smoke stack 100 by the stack effect.

In addition, the temperature of exhaust gas near the outlet of the smoke stack 100 is 110° C., for example.

By arranging the denitration device 90 on the downstream side of the air preheater 30, the temperature of exhaust gas denitrated by the denitration catalyst becomes lower, and it becomes possible to decrease the deterioration of the denitration catalyst.

<3.1.4 Fourth Combustion System>

Figure 20:
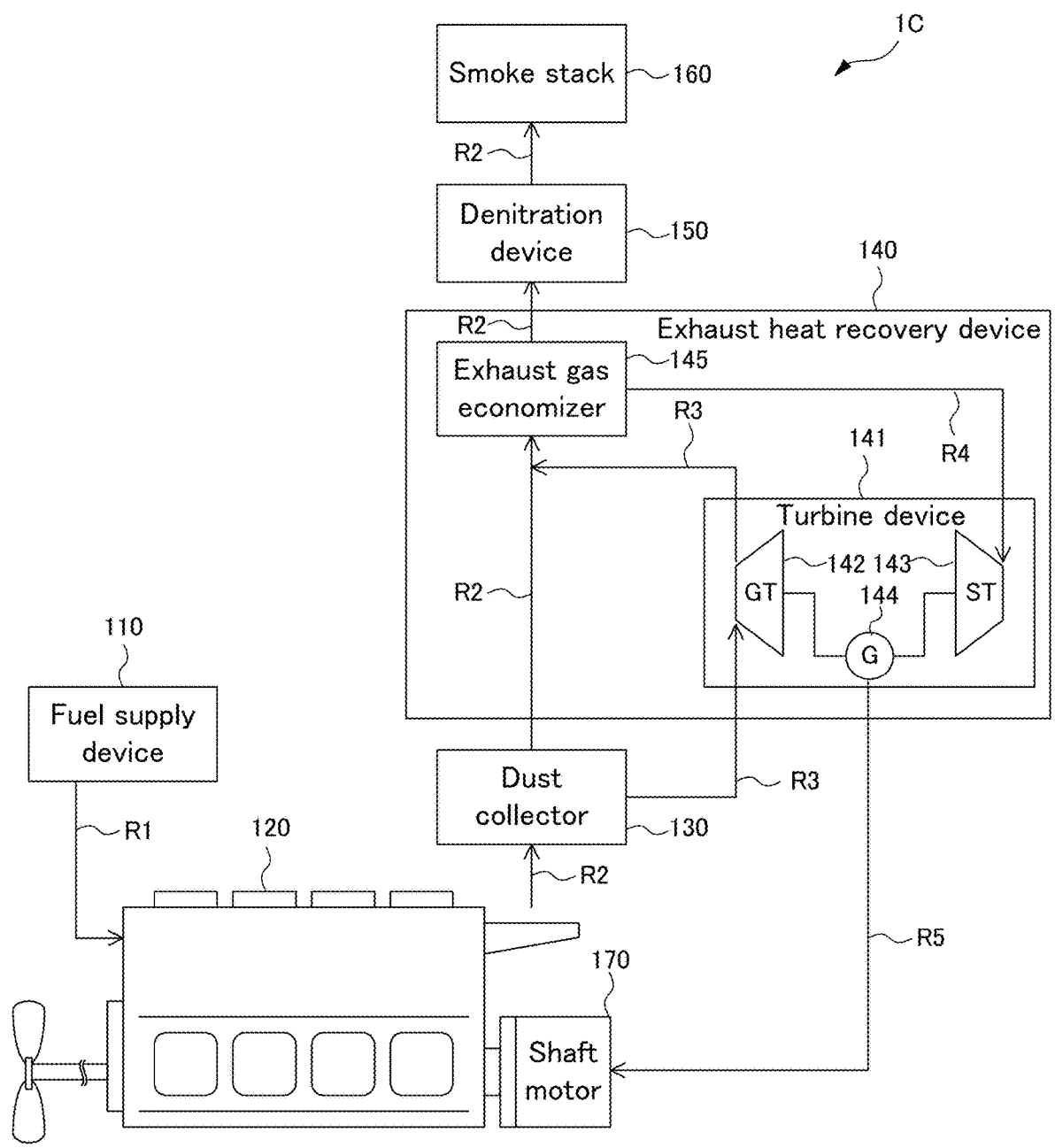
FIG. 20 is a view showing the configuration of a combustion system according to a fourth application example of the present invention.

FIG. 20 is a view showing the configuration of a combustion system 1C according to a fourth application example.

As shown in FIG. 20, the combustion system 1C is a combustion system used for the propulsion of ships, and includes: a fuel supply device 110, an internal combustion engine 120 as a combustion device, a dust collector 130, an exhaust recovery device 140, a denitration device 150, a smoke stack 160, a shaft motor 170, a fuel channel R1, exhaust channels R2 and R3, a steam channel R4, and a power line R5.

The fuel supply device 110 supplies fuel using the fuel channel R1 to the internal combustion engine 120.

As the fuel, for example, it is possible to use petroleum fuel such as light oil or heavy oil.

The fuel channel R1 has an upstream side connected to the fuel supply device 110, and a downstream side connected to the internal combustion engine 120.

The fuel channel R1 is a flow path to which fuel is transported from the fuel supply device 110 to the internal combustion engine 120.

The internal combustion engine 120 combusts the petroleum fuel together with air.

In the internal combustion engine 120, the exhaust gas is produced by the petroleum fuel combusting.

The produced exhaust gas is discharged to the dust collector 130 via the exhaust channel R2.

It should be noted that the internal combustion engine 120 may be a 2-stroke low-speed diesel engine used in a large ship, may be a 4-stroke high-speed diesel engine used in a ferry or the like, or may be a 4-stroke high-speed diesel engine used in a high-speed boat or small ship.

The exhaust channel R2 has an upstream side connected to the internal combustion engine 120.

The exhaust channel R2 is a flow path through which exhaust gas produced by the internal combustion engine 120 flows.

The dust collector 130 is arranged on the downstream side of the internal combustion engine 120 in the exhaust channel R2, and the exhaust gas discharged from the internal combustion engine 120 is supplied thereto.

The dust collector 130 is a device which collects ash dust in the exhaust gas.

As the ash dust collection method, for example, a method may be used which charges the ash dust by applying voltage to electrodes, and collects using Coulomb force.

Alternatively, a method may be used which collects ash dust by gas-liquid contact, by supplying a ash dust absorption liquid to a venturi portion, and atomizing the ash dust absorption liquid by exhaust gas which reaches high speed by this venturi portion, as in the method conducted by a venturi scrubber.

The exhaust heat recovery device 140 is arranged on the downstream side of the dust collector 130 in the exhaust channel, and exhaust gas from which ash dust was removed by the dust collector 130 is supplied thereto.

The exhaust heat recovery device 140 recovers exhaust heat from exhaust gas supplied from the dust collector 130.

More specifically, the exhaust heat recovery device 140 includes a turbine device 141 and exhaust gas economizer 145.

The turbine device 141 includes a gas turbine 142, steam turbine 143 and generator 144.

The gas turbine 142 and generator 144, and the steam turbine 143 and generator 144 are connected to each other.

The gas turbine 142 is driven by exhaust gas supplied from the dust collector 130 through the exhaust channel R3.

When the gas turbine 142 is driven, the generator 144 connected to the gas turbine 142 is also driven in connection to perform power generation.

In addition, the steam turbine 143 is driven by steam supplied from the exhaust gas economizer 145 described later, through the steam channel R4.

When the steam turbine 143 is driven, the generator 144 connected to the steam turbine 143 also operates in connection to perform power generation.

The electric power generated by the generator 144 is supplied to the shaft motor 170 through the power line R5.

The exhaust gas economizer 145 generates steam from water stored in a water supply tank (not illustrated), with the exhaust gas supplied from the dust collector 130 through the exhaust channel R2, and exhaust gas supplied from the gas turbine 142 through the exhaust channel R3 as the heat source.

The steam generated by the exhaust gas economizer 145 is supplied to the steam turbine 143 through the steam channel R4.

The exhaust channel R3 is a different exhaust channel than the exhaust channel R2, with the upstream side being connected to the dust collector 130 and the downstream side being connected to the exhaust gas economizer 145, and midstream thereof, goes through the gas turbine 142.

The exhaust channel R3 is a flow path which flows the exhaust gas supplied from the dust collector 130 to the exhaust gas economizer 145 through the gas turbine 142.

The steam channel R4 has an upstream side connected to the exhaust gas economizer 145, and a downstream side connected to the steam turbine 143.

The steam channel R4 is a flow path through which steam generated by the exhaust gas economizer 145 flows.

The power line R5 has an upstream side connected to the generator 144, and a downstream side connected to the shaft motor 170.

The power line is a flow path through which electricity generated by the generator 144 flows.

The denitration device 150 is arranged on the downstream side of the exhaust heat recovery device 140 in the exhaust channel R2, and the exhaust gas from which exhaust heat was recovered is supplied thereto.

The denitration device 150 removes nitrogen oxides from the exhaust gas by way of the denitration catalyst.

The denitration device 150 uses a denitration catalyst containing vanadium oxide, in which the carbon content is at least 0.05 wt %, and the above-mentioned denitration catalyst has a defect site at which an oxygen deficiency occurs in the crystal structure.

Since the denitration device 150 is installed on the downstream side of the exhaust heat recovery device 140, the temperature of exhaust gas in the denitration device 150 is 130 to 200° C., for example.

The denitration device 150 removes nitrogen oxides from exhaust gas by way of a selective catalytic reduction process.

According to the selective catalytic reduction process, it is possible to remove nitrogen oxides efficiently from exhaust gas, by generating nitrogen and water from the nitrogen oxides by way of a reductant and denitration catalyst.

The reductant used in the selective catalytic reduction process contains at least one of ammonia and urea.

In the case of using ammonia as the reductant, ammonia in any state of ammonia gas, liquid ammonia and ammonia aqueous solution may be used.

More specifically, the denitration device 150 can be a configuration which injects ammonia gas to the introduced exhaust gas, and then contacts this mixed gas with the denitration catalyst.

The smoke stack 160 is connected at a downstream side of the exhaust channel R2.

The exhaust gas from which nitrogen oxides have been removed in the denitration device 150 is introduced to the smoke stack 160.

The exhaust gas introduced to the smoke stack 160 is effectively discharged from the top of the smoke stack 160 by way of the stack effect, due to the temperature of the exhaust gas in the denitration device 150 being 130 to 200° C., for example.

In addition, it is possible to prevent water vapor from condensing above the smoke stack 160 and white smoke generating.

The temperature of the exhaust gas near the outlet of the smoke stack 160 is 110° C., for example.

The shaft motor 170 is installed on the downstream side of the generator 144 in the power line R5, and is driven so as to aid rotation around the propeller shaft of the internal combustion engine 120.

Electric power is supplied to the shaft motor 170 from the generator 144 through the power line R5, and by using this electric power, drives so as to aid the motive power generated by the internal combustion engine 120.

<3.1.5 Fifth Combustion System>

In addition, although not illustrated, a fifth application example may be a denitration device which equips, to a combustion system that incinerates raw garbage, etc., a denitration catalyst containing vanadium oxide, and having a carbon content of at least 0.05 wt %, and the above denitration catalyst having a defect site at which an oxygen deficiency occurs in the crystal structure.

In the denitration device installed at a later stage than the boiler combusting raw garbage, although the temperature of exhaust gas may be no more than 150° C., since the above-mentioned denitration catalyst can be used in denitration having a reaction temperature of 80 to 150° C., it is useful also for such a denitration system.

<3.2 Denitration Catalyst Made by Coating Catalyst Component on Substrate>

The above-mentioned denitration catalyst is basically powder form; however, for example, a honeycomb-type catalyst made by coating catalyst component on a honeycomb shape substrate may be used in a flue gas denitration apparatus installed at a thermal power plant, as disclosed in Japanese Unexamined Patent Application, Publication No. 2005-199108.

In the present invention, as a sixth application example, it is possible to coat the above-mentioned denitration catalyst as the catalyst component on a substrate.

So long as deformation, etc. does not occur at temperatures of 200° C. or higher, any substrate can be used as the above-mentioned substrate.

For example, ceramics, pottery and metals such as titanium may be used as the substrate.

Alternatively, as the substrate, a corrugated honeycomb filter made from a ceramic fiber paper, glass fiber paper, flame-retardant paper, activated carbon paper, deodorizing paper, honeycomb filter nonwoven fabric, felt, or plastic sheet may be used.

Alternatively, the catalyst component of the present invention may be further coated on a new catalyst or a used catalyst.

In addition, the substrate can be made into any form, and can be established as any among a plate-like shape, pellet shape, fluid form, columnar shape, star shape, ring shape, extruded shape, spherical shape, flake shape, pastille shape, rib extruded shape, or ribbed ring shape, for example.

For example, the corrugated honeycomb filter can assume any form such as block type, rotor type, diagonal type, deformed block, strip type and mini pleats.

<3.3 Denitration Catalyst Molded in Block Shape>

Furthermore, a catalyst block such as a honeycomb catalyst may be used in the denitration device equipped to a coal-fired power generation facility; however, in the present invention, it is possible to produce a catalyst block with the above-mentioned denitration catalyst as the catalyst component as a seventh application example, as disclosed in Japanese Unexamined Patent Application, Publication No. 2017-32215, for example.

More specifically, it is possible to produce the catalyst block by mixing and kneading 1 to 50 wt % of CMC (carboxymethyl cellulose) or PVA (polyvinyl alcohol), for example, as a binder to the above-mentioned denitration catalyst of powder form, extrusion molding by a molder such as a pellet mill or vacuum extruder, or press molding, then drying, followed by firing.

It should be noted that, upon firing, since the above-mentioned binder is burned off, the weight ratio of the above-mentioned denitration catalyst in the catalyst block after firing becomes 100 wt %.

In addition, it is possible to produce the catalyst block by, after further mixing titanium molybdenum, tungsten and/or other compounds (particularly oxides), or silica, etc. to the above-mentioned denitration catalyst of powder form, then kneading, and extrusion molding.

The catalyst block can assume any form, for example, and it is possible to make into plate-like shape, pellet shape, fluid form, columnar shape, star shape, ring shape, extruded shape, spherical shape, flake shape, honeycomb shape, pastille shape, rib extruded shape, or ribbed ring shape.

In addition, for example, the catalyst block of honeycomb shape may have a honeycomb surface which is a polygonal shape such as triangular, quadrilateral, pentagonal or hexagonal, or circular form.

<3.4 Other Applications>

As applications of the above-mentioned denitration catalyst, a combustion system is mentioned in 3.1, a denitration catalyst made by coating the denitration component on a substrate is mentioned in 3.2, and a denitration catalyst molded into block form is mentioned in 3.3; however, the applications of the denitration catalyst are not limited thereto.

For example, a combustion system with pulverized coal as the fuel is mentioned in 3.1.1 and 3.1.2, and a combustion system with natural gas as the fuel is mentioned in 3.1.3; however, the above-mentioned denitration catalyst may be used in a combustion system using oil or biomass fuel in place of pulverized coal or natural gas.

In addition, a combustion system used for the propulsion of ships was mentioned in 3.1.4; however, the above-mentioned denitration catalyst may be used in a combustion system used for propelling automobiles instead of ships.

According to the combustion system related to the above-mentioned application examples, the following effects are exerted.

(1) As mentioned above, the combustion system 1 according to the above application example arranged the denitration device 90 on the downstream side of the dust collector 50, in the exhaust channel L1 through which exhaust gas generated in the boiler (combustion device) 10 flows.

Furthermore, the above embodiment uses, in the denitration device 90, a denitration catalyst containing vanadium oxide, having a carbon content of at least 0.05 wt %, and having a defect site at which an oxygen deficiency occurs in the crystal structure.

By using the above-mentioned denitration catalyst, the combustion system 1 according to the above embodiment can exhibit an effect whereby the denitration efficiency at low temperature is even higher compared to the conventional technology, upon a selective catalytic reduction reaction with ammonia as the reductant.

(2) The combustion system 1A according to the above application example further includes the air preheater 30 which recovers heat from the exhaust gas, and the air preheater 30 is arranged on the upstream side of the dust collector 50.

By the exhaust gas which has been heat recovered by the air preheater 30 being supplied to the dust collector 50, the load on the dust collector 50 by the heat of exhaust gas can be suppressed.

In addition, since the denitration device 90 is not arranged upstream of the air preheater 30 which is normally arranged near the boiler (combustion device) 10 in the exhaust channel L1, clogging of the air preheater 30 caused by ammonium sulfate produced by ammonia and sulfur component in exhaust gas reacting will not occur.

The cost of operation of the combustion system 1A is thereby low.

(3) The combustion system 1B according to the above application example arranges the denitration device 90 on the downstream side of the air preheater 30, in the exhaust channel L1 through which exhaust gas produced in the boiler (combustion device) 10 flows.

Furthermore, the above embodiment uses, in the denitration device 90, a denitration catalyst containing vanadium oxide, having a carbon content of at least 0.05 wt %, and having a defect site at which an oxygen deficiency occurs in the crystal structure.

By using the above-mentioned denitration catalyst, the combustion system 1A according to the above embodiment can exhibit an effect whereby the denitration efficiency at low temperature is even higher compared to the conventional technology, upon selective catalytic reduction reaction with ammonia as the reductant.

In addition, since it is thereby possible to arrange the denitration device 90 on the downstream side of the air preheater 30, the temperature of the exhaust gas denitrated by the denitration catalyst is lower, and it is possible to decrease deterioration of the denitration catalyst.

In addition, the combustion system 1 of the above embodiment does not establish the dust collector and desulfurization device as essential constituent elements.

Therefore, by simplifying the configuration of the combustion system 1B, it becomes possible to lower the installation cost.

(4) The combustion system 1C according to the above-mentioned application example includes: the exhaust channel R2 through which exhaust gas generated by fuel combusting in the internal combustion engine 120 flows; the exhaust heat recovery device 140 which is arranged in the exhaust channel R2 and recovers exhaust heat from the exhaust gas discharged from the internal combustion engine 120; and the denitration device 150 which is arranged in the exhaust channel R2 and removes nitrogen oxides from exhaust gas by way of the denitration catalyst, in which the denitration device 150 is arranged on the downstream side of the exhaust heat recovery device 140 in the exhaust channel R2, and the denitration catalyst contains vanadium oxide, has a carbon content of at least 0.05 wt %, and has a defect site at which an oxygen deficiency occurs in the crystal structure.

By using the above-mentioned denitration catalyst, the combustion system 1C according to the above embodiment can exhibit an effect whereby the denitration efficiency at low temperature is even higher compared to the conventional technology, upon selective catalytic reduction reaction with ammonia as the reductant.

Furthermore, immediately before introducing exhaust gas to the denitration device 150, it is not essential to heat the exhaust gas. Since the denitration catalyst is thereby no longer exposed to high temperatures, the deterioration of denitration catalyst is decreased, and the cost of operation of the combustion system 1C becomes lower. In addition, the combustion system 1C of the above embodiment can be made a more compact configuration by the amount by which heaters for warming the exhaust gas are not essential.

It thereby becomes possible to install the combustion system with a denitration device in a narrow space such as that of a ship.

(5) As mentioned above, it is preferable for the exhaust heat recovery device 140 to include the turbine device 141 and exhaust gas economizer 145, in which the exhaust gas economizer 145 produces steam with exhaust gas discharged from the internal combustion engine 120 and exhaust gas supplied from the turbine device 141 as heat sources, and the turbine device 141 conducts power generation using the exhaust gas discharged from the internal combustion engine 120 and steam supplied from the exhaust gas economizer 145.

The exhaust heat recovery device 140 in the above embodiment can more effectively use the heat energy generated by combustion of fuel in the internal combustion engine 120, by including the turbine device 141 and exhaust gas economizer 145.

(6) As mentioned above, in the denitration catalyst according to the above-mentioned application example, "having a defect site at which an oxygen deficiency occurs" preferably indicates a ratio (P1/P2) of a peak intensity P2 of wavelength 494 to 549 cm$^{-1}$ originating from edge-sharing 3V—Oc stretching vibration relative to a peak intensity P1 of wavelength 462 to 494 cm$^{-1}$ originating from crosslinked V—O$_B$—V bending vibration being 0.98 or less, in infrared transmission spectrum of the denitration catalyst.

For the denitration catalyst according to the above application example, the adsorption of NO tends to occur, and can thereby exhibit higher NO conversion rate.

EXPLANATION OF REFERENCE NUMERALS 1, 1A, 1B, 1C combustion system
10 boiler
15 vaporizer
30 air preheater
50 electrostatic precipitator
90, 150 denitration device
100, 160 smoke stack
110 fuel supply device
120 internal combustion engine
130 dust collector
140 exhaust heat recovery device
141 turbine device
145 exhaust gas economizer
170 shaft motor

The invention claimed is:

1. A combustion system comprising:
a combustion device which combusts a fuel;
an exhaust channel through which exhaust gas generated by the fuel combusting in the combustion device flows;
a dust collector which is disposed in the exhaust channel, and collects ash dust in the exhaust gas; and
a denitration device which is disposed in the exhaust channel, and removes nitrogen oxides from the exhaust gas by way of a denitration catalyst,
wherein the denitration device is disposed on a downstream side of the dust collector in the exhaust channel, and
wherein the denitration catalyst contains vanadium oxide, has a carbon content of at least 0.05 wt %, and has a defect site at which an oxygen deficiency occurs in a crystal structure.

2. The combustion system according to claim 1, wherein the combustion system further includes an air preheater disposed in the exhaust channel, and recovers heat from the exhaust gas, and
wherein the air preheater is disposed on an upstream side of the dust collector.

3. The combustion system according to claim 1,
wherein having a defect site at which an oxygen deficiency occurs indicates a ratio (P1/P2) of a peak intensity P2 of wavelength 494 to 549 cm$^{-1}$ originating from edge-sharing 3V—Oc stretching vibration relative to a peak intensity P1 of wavelength 462 to 494 cm$^{-1}$ originating from crosslinked V—O$_B$—V bending vibration being 0.98 or less,
in infrared transmission spectrum of the denitration catalyst.

4. A combustion system comprising:
a combustion device which combusts a fuel;
an exhaust channel through which exhaust gas generated by the fuel combusting in the combustion device flows;
an air preheater which is disposed in the exhaust channel, and recovers heat from the exhaust gas; and
a denitration device which is disposed in the exhaust channel, and removes nitrogen oxides from the exhaust gas by way of a denitration catalyst,
wherein the denitration device is disposed on a downstream side of the air preheater in the exhaust channel, and
wherein the denitration catalyst contains vanadium oxide, has a carbon content of at least 0.05 wt %, and has a defect site at which an oxygen deficiency occurs in a crystal structure.

5. A combustion system comprising:
an internal combustion engine which combusts a fuel;
an exhaust channel through which exhaust gas generated by the fuel combusting in the internal combustion engine flows;
an exhaust heat recovery device which is disposed in the exhaust channel and recovers exhaust heat from exhaust gas discharged from the internal combustion engine; and
a denitration device which is disposed in the exhaust channel, and removes nitrogen oxides from the exhaust gas by way of a denitration catalyst,
wherein the denitration device is disposed on a downstream side of the exhaust heat recovery device in the exhaust channel, and
wherein the denitration catalyst contains vanadium oxide, has a carbon content of at least 0.05 wt %, and has a defect site at which an oxygen deficiency occurs in a crystal structure.

6. The combustion system according to claim 5,
wherein the exhaust heat recovery device includes a turbine device and an exhaust gas economizer,
wherein the exhaust gas economizer generates steam with exhaust gas discharged from the internal combustion engine and exhaust gas supplied from the turbine device as heat sources, and
wherein the turbine device conducts power generation using the exhaust gas discharged from the internal combustion engine and steam supplied from the exhaust gas economizer.

* * * * *